US008019349B2

(12) United States Patent
Noda et al.

(10) Patent No.: US 8,019,349 B2
(45) Date of Patent: Sep. 13, 2011

(54) TELEPHONE CONVERSATION RESUMPTION SYSTEM, TELEPHONE CONVERSATION RESUMPTION PROGRAM, TELEPHONE CONVERSATION RESUMPTION METHOD, PORTABLE TERMINAL AND RELAY APPARATUS

(75) Inventors: Masahide Noda, Kawasaki (JP); Satoshi Okuyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 780 days.

(21) Appl. No.: 11/495,753

(22) Filed: Jul. 31, 2006

(65) Prior Publication Data

US 2007/0232297 A1    Oct. 4, 2007

(30) Foreign Application Priority Data

Mar. 30, 2006  (JP) ................................. 2006-095288

(51) Int. Cl.
*H04W 40/00*  (2009.01)
(52) U.S. Cl. ...................... 455/445; 455/115.1; 455/564; 455/517; 455/63.1; 455/426.2; 370/228; 370/329; 370/331; 370/334; 380/269; 380/270; 380/271; 700/21; 700/28; 700/32; 700/104
(58) Field of Classification Search ............... 455/414.1, 455/564, 1, 115.1, 517, 63.1; 370/228, 329, 370/331, 334; 380/269, 270, 271; 700/21, 700/28, 32, 104
See application file for complete search history.

(56) References Cited

U.S. PATENT DOCUMENTS

| 5,752,185 A * | 5/1998 | Ahuja ........................ 455/414.1 |
| 2005/0202849 A1* | 9/2005 | Ignatin ........................... 455/564 |
| 2005/0282541 A1 | 12/2005 | Iizuka et al. |

FOREIGN PATENT DOCUMENTS

| JP | 5-344557 A | 12/1993 |
| JP | 10-322768 A | 12/1998 |
| JP | 10-327465 A | 12/1998 |
| JP | 2004-159267 A | 6/2004 |
| JP | 2005-20110 A | 1/2005 |
| JP | 2005-192163 A | 7/2005 |
| JP | 2006-5772 A | 1/2006 |

* cited by examiner

*Primary Examiner* — Nimesh Patel
(74) *Attorney, Agent, or Firm* — Fujitsu Patent Center

(57) ABSTRACT

In a communication network including a relay apparatus and a call control apparatus, a telephone conversation resumption system includes: a reservation unit, when a judgment unit detects communication impossibility between a portable terminal and the relay apparatus, records terminal identification data that specifies the portable terminal and an other-end terminal in a recording unit; a continuation processing unit that generates a call with the other-end terminal indicated by the terminal identification data and transmits a message to the other-end terminal; and a resumption unit that, when the judgment unit detects recovery of the communication state of the portable terminal, requests the call control apparatus to resume the telephone conversation between the portable terminal and the other-end terminal using the terminal identification data. With this configuration, even when the portable terminal becomes impossible to communicate, the telephone conversation resumption system can resume a telephone conversation easily.

7 Claims, 18 Drawing Sheets

FIG.5A

| Reservation ID | Reserved terminal | Other-end terminal | Telephone conversation identifier |
|---|---|---|---|
| 1 | A | B | foo@example.com |

| Reservation ID | Reserved terminal | Other-end terminal | Telephone conversation identifier |
|---|---|---|---|
| 1 | A | B | park@example.com |

| Caller | Callee | Telephone conversation identifier |
|---|---|---|
| B | A | foo@example.com |

| Caller | Callee | Telephone conversation identifier |
|---|---|---|
| B | PS | park@example.com |

| Caller | Callee | Telephone conversation identifier |
|---|---|---|
| B | A | new@example.com |

⎬ 65

TELEPHONE CONVERSATION RESUMPTION SYSTEM, TELEPHONE CONVERSATION RESUMPTION PROGRAM, TELEPHONE CONVERSATION RESUMPTION METHOD, PORTABLE TERMINAL AND RELAY APPARATUS

BACKGROUND OF THE INVENTION

1. Field of the Invention

The present invention relates to a telephone conversation resumption system, a telephone conversation resumption program and a telephone conversation resumption method that resume a telephone conversation when the telephone conversation between wireless portable terminals is disconnected, and also relates to a portable terminal and a relay apparatus that are used for the resumption of a telephone conversation.

2. Description of Related Art

In recent years, mobile phones and portable terminals that enable a wireless telephone conversation using an IP phone or the like via wireless LAN have become popular. Thus, we can often see the scene where people talk over a portable phone while moving. Such a portable phone enables a telephone conversation by performing wireless communication with a relay apparatus (e.g., a mobile-phone base station and an access point of wireless LAN). Thus, when a portable terminal in a telephone conversation moves outside a cover area of the relay apparatus, the telephone conversation might be disconnected.

To cope with such disconnection of a telephone conversation, a method of trying to resume the telephone conversation has been proposed (see JP H10(1998)-327465 A, for example). According to this method, when a telephone conversation is disconnected due to deterioration of a communication state, a terminal tries to resume the telephone conversation by automatically redialing at the timing of the recovery of the communication state.

However, when one of the phones on both ends of the telephone conversation moves outside a cover area of a relay apparatus, so that the telephone conversation is disconnected, a speaker of the other phone cannot tell why the telephone conversation aborted suddenly. Therefore, the speaker of the other phone cannot make a judgment whether to wait for a call or to call back. Furthermore, even if the speaker of the other phone tries to call back, he/she cannot know when to make a call because the state of the phone on the other end is uncertain. Moreover, even if the speaker of the other phone calls back, in the case where the phone on the other end is still outside the cover area of the relay apparatus, he/she still has to call back again.

In addition, in the case where a speaker of the phone outside the cover area of the relay apparatus enters the cover area again where the telephone conversation is possible, if the telephone number of the party on the other end is uncertain, he/she cannot redial. In this way, there are problems that the speakers on both ends cannot know the mutual situations, and therefore they cannot resume the telephone conversation easily.

SUMMARY OF THE INVENTION

Therefore, with the foregoing in mind, it is an object of the present invention to provide a telephone conversation resumption system, a telephone conversation resumption program and a telephone conversation resumption method whereby, even when one of portable terminals in a telephone conversation becomes impossible to communicate, a speaker of the other portable terminal can understand the situation, and the telephone conversation can be resumed easily, and to provide a portable terminal and a relay apparatus that are used for the resumption of a telephone conversation.

In a communication network including a relay apparatus that performs wireless communication with portable terminals and a call control apparatus that controls a call for starting or completing a telephone conversation between a plurality of terminals including a portable terminal and records information for specifying terminals in a telephone conversation, a telephone conversation resumption system of the present invention is for resuming a telephone conversation of a portable terminal that has become impossible to communicate with the relay apparatus during the telephone conversation. The telephone conversation resumption system includes: a judgment unit that detects communication impossibility between a portable terminal in a telephone conversation and the relay apparatus due to deterioration of a communication state between the portable terminal and the relay apparatus and recovery of the communication state between the portable terminal and the relay apparatus; a reservation unit that, when the judgment unit detects the communication impossibility between the portable terminal and the relay apparatus, acquires terminal identification data that specifies the portable terminal that has become impossible to communicate and an other-end terminal that is a terminal of a party on the other end of the telephone conversation from the call control apparatus, the relay apparatus or the portable terminal and records the terminal identification data in a recording unit provided in the telephone conversation resumption system; a continuation processing unit that requests the call control apparatus to generate a call with the other-end terminal indicated by the terminal identification data, and after the call is generated, transmits a message to the other-end terminal, the message containing information representing a communication state of the telephone conversation between the portable terminal and the other-end terminal or an operational instruction to a speaker of the other-end terminal; and a resumption unit that, when the judgment unit detects recovery of the communication state between the portable terminal and the relay apparatus, requests the call control apparatus to generate a call for resuming the telephone conversation between the portable terminal and the other-end terminal using the terminal identification data.

In the case where the communication between the relay apparatus and one portable terminal among portable terminals in a telephone conversation becomes impossible because of deterioration of the communication state between the relay apparatus and the portable terminal, the judgment unit detects the communication impossibility. When the judgment unit detects the communication impossibility, the reservation unit records terminal identification data that specifies the portable terminal that has become impossible to communicate and the other-end terminal in the recording unit. Based on the terminal identification data recorded in the recording unit, the continuation processing unit transmits a request for generating a call between the other-end terminal and the continuation processing unit to the call control apparatus. When the call control apparatus receiving the generation request generates the call, the continuation processing unit becomes capable of transmitting a message to the other-end terminal. This message contains information indicating the communication state of the telephone conversation between the portable terminal and the other-end terminal or operational instructions to the speaker of the other-end terminal. This message allows the speaker of the other-end terminal to inform of the communication state of the telephone conversation with the portable terminal, operational instructions and the like. When the communication state between the portable terminal and the relay apparatus recovers, the resumption unit receives data indicating the recovery, and transmits a request for generating a call between the portable terminal and the other-end terminal indicated by the terminal identification data to the call control apparatus. Thereby, a telephone conversation can be resumed between the portable terminal and the other-end terminal. In this way, with the functions of the judgment unit, the reservation unit, the continuation processing unit and the resumption unit, even when a telephone conversation becomes impossible due to deterioration of the communication state between the portable terminal and the relay apparatus, the speaker of the other-end terminal can understand the situation and the telephone conversation can be resumed easily.

In the telephone conversation resumption system according to the present invention, preferably, the judgment unit receives a signal transmitted from the portable terminal via the relay apparatus and detects, in accordance with the signal, the communication impossibility due to deterioration of a communication state between the portable terminal and the relay apparatus and recovery of the communication state between the portable terminal and the relay apparatus.

The judgment unit receives the signal transmitted from the portable terminal via the relay apparatus and detects, in accordance with the signal, the communication impossibility and the recovery of the communication state. Therefore, there is no need to provide a judgment unit in the portable terminal and the relay apparatus. That is, in order to configure a telephone conversation resumption system, there is no need to newly add a judgment unit in the portable terminal and the relay apparatus. Therefore, a telephone conversation resumption system can be configured using already available portable terminals and relay apparatuses. As a result, a telephone conversation resumption system can be introduced at a low cost.

In the telephone conversation resumption system according to the present invention, preferably, the judgment unit is provided in the relay apparatus and detects, in accordance with a signal transmitted from the portable terminal to the relay apparatus, the communication impossibility due to deterioration of a communication state between the portable terminal and the relay apparatus and recovery of the communication state between the portable terminal and the relay apparatus.

The judgment unit provided in the relay apparatus allows the relay apparatus to directly monitor the communication state in accordance with the signal transmitted from the portable terminal. Therefore, the communication impossibility between the portable terminal and the relay apparatus and the recovery of the communication state can be detected quickly.

In the telephone conversation resumption system according to the present invention, preferably, the judgment unit is provided in the portable terminal, and the portable terminal can access another communication network having a communication mode different from the communication network via wireless communication using the relay apparatus. The reservation unit and the resumption unit can access the another communication network, and the judgment unit passes data indicating the communication impossibility between the portable terminal and the relay apparatus to the reservation unit via the another communication network, and passes data indicating recovery of the communication state with the relay apparatus to the resumption unit via the another communication network.

The judgment unit provided in the portable terminal allows the portable terminal to directly monitor the communication state with the relay apparatus. Therefore, the communication impossibility between the portable terminal and the relay apparatus and the recovery of the communication state can be detected quickly.

A relay apparatus of the present invention is connected with a communication network including: a call control apparatus that controls a call for starting or completing a telephone conversation between a plurality of terminals including a portable terminal and records information for specifying terminals in a telephone conversation; and a telephone conversation resumption system. The relay apparatus relays communication between a portable terminal and the communication network by performing wireless communication with the portable terminal. The relay apparatus includes a judgment unit that detects communication impossibility between a portable terminal in a telephone conversation and the relay apparatus due to deterioration of a communication state between the portable terminal and the relay apparatus and recovery of the communication state between the portable terminal and the relay apparatus. The telephone conversation resumption system included in the communication network to which the relay apparatus is connected includes: a reservation unit that, when the judgment unit detects the communication impossibility between the portable terminal and the relay apparatus, acquires terminal identification data that specifies the portable terminal that has become impossible to communicate and an other-end terminal that is a terminal of a party on the other end of the telephone conversation from the call control apparatus, the relay apparatus or the portable terminal and records the terminal identification data in a recording unit provided in the telephone conversation resumption system; a continuation processing unit that requests the call control apparatus to generate a call with the other-end terminal indicated by the terminal identification data, and after the call is generated, transmits a message to the other-end terminal, the message containing information representing a communication state of the telephone conversation between the portable terminal and the other-end terminal or an operational instruction to a speaker of the other-end terminal; and a resumption unit that, when the judgment unit detects recovery of the communication state between the portable terminal and the relay apparatus, requests the call control apparatus to generate a call for resuming the telephone conversation between the portable terminal and the other-end terminal using the terminal identification data.

In a first communication network including a relay apparatus that performs wireless communication with portable terminals and a call control apparatus that controls a call for starting or completing a telephone conversation between a plurality of terminals including a portable terminal and records information for specifying terminals in a telephone conversation, a telephone conversation resumption system according to the present invention is for resuming a telephone conversation of a portable terminal that has become impossible to communicate with the relay apparatus during the telephone conversation. The portable terminal is capable of accessing the first communication network and a second communication network having a communication mode different from the first communication network and being connected with the telephone conversation resumption system. The portable terminal includes a judgment unit that performs a processing of, during a telephone conversation via the first communication network, detecting communication impossibility with the relay apparatus due to deterioration of a communication state with the relay apparatus and passing data indicating the communication impossibility to the telephone conversation resumption system via the second communication network, and a processing of detecting recovery of the communication state with the relay apparatus and transmitting data indicating the recovery of the communication state to the telephone conversation resumption system via the first communication network or the second communication network. The telephone conversation resumption system includes: a reservation unit that, when data indicating the communication impossibility between the portable terminal and the relay apparatus is received from the portable terminal via the second communication network, acquires terminal identification data that specifies the portable terminal and an other-end terminal that is a terminal of a party on the other end of the telephone conversation from the call control apparatus or the relay apparatus in the first communication network or the portable terminal and records the terminal identification data in a recording unit provided in the telephone conversation resumption system; a continuation processing unit that requests the call control apparatus to generate a call with the other-end terminal indicated by the terminal identification data, and after the call is generated, transmits a message to the other-end terminal, the message containing information representing a communication state of the telephone conversation between the portable terminal and the other-end terminal or an operational instruction to a speaker of the other-end terminal; and a resumption unit that, when data indicating recovery of the communication state between the portable terminal and the relay apparatus is received from the portable terminal via the second communication network, requests the call control apparatus to generate a call for resuming the telephone conversation between the portable terminal and the other-end terminal using the terminal identification data.

Since the portable terminal can access a plurality of different communication schemes, if the communication state of one of the communication schemes deteriorates, the deterioration or the recovery of the communication state can be announced using another communication scheme that can communicate, whereby the telephone conversation can be resumed more easily.

A portable terminal of the present invention is capable of accessing a first communication network and a second communication network, the first communication network including a relay apparatus that performs wireless communication with portable terminals, a call control apparatus that controls a call for starting or completing a telephone conversation between a plurality of terminals including a portable terminal and records information for specifying terminals in a telephone conversation and a telephone conversation resumption system, and the second communication network having a communication mode different from the first communication network and being connected with the telephone conversation resumption system. The portable terminal includes a judgment unit that performs a processing of, during a telephone conversation via the first communication network, detecting communication impossibility with the relay apparatus due to deterioration of a communication state with the relay apparatus and passing data indicating the communication impossibility to the telephone conversation resumption system via the second communication network, and a processing of detecting recovery of the communication state with the relay apparatus and transmitting data indicating the recovery of the communication state to the telephone conversation resumption system via the first communication network or the second communication network.

A telephone conversation resumption program of the present invention makes a computer execute a processing of, in a communication network including a relay apparatus that performs wireless communication with portable terminals and a call control apparatus that controls a call for starting or completing a telephone conversation between a plurality of terminals including a portable terminal and records information for specifying terminals in a telephone conversation, resuming a telephone conversation of a portable terminal that has become impossible to communicate with the relay apparatus during the telephone conversation. The program makes the computer execute the following processings of: a judgment processing of detecting communication impossibility between a portable terminal in a telephone conversation and the relay apparatus due to deterioration of a communication state between the portable terminal and the relay apparatus and recovery of the communication state between the portable terminal and the relay apparatus; a reservation processing of, when the communication impossibility between the portable terminal and the relay apparatus is detected in the judgment processing, acquiring terminal identification data that specifies the portable terminal that has become impossible to communicate and an other-end terminal that is a terminal of a party on the other end of the telephone conversation from the call control apparatus, the relay apparatus or the portable terminal and recording the terminal identification data in a recording unit provided in the computer; a continuation processing of requesting the call control apparatus to generate a call with the other-end terminal indicated by the terminal identification data, and after the call is generated, transmitting a message to the other-end terminal, the message containing information representing a communication state of the telephone conversation between the portable terminal and the other-end terminal or an operational instruction to a speaker of the other-end terminal; and a resumption processing of, when recovery of the communication state between the portable terminal and the relay apparatus is detected in the judgment processing, requesting the call control apparatus to generate a call for resuming the telephone conversation between the portable terminal and the other-end terminal using the terminal identification data.

The telephone conversation resumption program of the present invention has the same effects as those of the above-stated telephone conversation resumption system and the relay apparatus.

In a communication network including a relay apparatus that performs wireless communication with portable terminals and a call control apparatus that controls a call for starting or completing a telephone conversation between a plurality of terminals including a portable terminal and records information for specifying terminals in a telephone conversation, a telephone conversation resumption method of the present invention is for making a computer resume a telephone conversation of a portable terminal that has become impossible to communicate with the relay apparatus during the telephone conversation. The method includes the steps of: a judgment step in which a judgment unit provided in the computer detects communication impossibility between a portable terminal in a telephone conversation and the relay apparatus due to deterioration of a communication state between the portable terminal and the relay apparatus and recovery of the communication state between the portable terminal and the relay apparatus; a reservation step in which, when the communication impossibility between the portable terminal and the relay apparatus is detected in the judgment step, a reservation unit provided in the computer acquires terminal identification data that specifies the portable terminal that has become impossible to communicate and an other-end terminal that is a terminal of a party on the other end of the telephone conversation from the call control apparatus, the relay apparatus or the portable terminal and recording the terminal identification data in a recording unit provided in the computer; a continuation step in which a continuation processing unit provided in the computer requests the call control apparatus to generate a call with the other-end terminal indicated by the terminal identification data, and after the call is generated, transmits a message to the other-end terminal, the message containing information concerning the telephone conversation between the portable terminal and the other-end terminal; and a resumption step in which, when recovery of the communication state between the portable terminal and the relay apparatus is detected in the judgment step, a resumption unit provided in the computer requests the call control apparatus to generate a call for resuming the telephone conversation between the portable terminal and the other-end terminal using the terminal identification data.

The telephone conversation resumption method of the present invention has the same effects as those of the above-stated telephone conversation resumption system, the relay apparatus and the telephone conversation resumption program.

According to the present invention, a telephone conversation resumption system, a telephone conversation resumption program and a telephone conversation resumption method can be provided whereby, even when one of portable terminals in a telephone conversation becomes impossible to communicate, a speaker of the other portable terminal can understand the situation, and the telephone conversation can be resumed easily. Further, a portable terminal and a relay apparatus that are used for the resumption of a telephone conversation can be provided.

These and other advantages of the present invention will become apparent to those skilled in the art upon reading and understanding the following detailed description with reference to the accompanying figures.

BRIEF DESCRIPTION OF THE DRAWINGS

FIG. 5A shows a reservation table 64 without data recorded therein, and FIG. 5B shows the reservation table 64 with data recorded therein.

FIGS. 6A, B and C show specific examples of data recorded in a telephone conversation state table 65 of a telephone conversation state recording unit 22.

DETAILED DESCRIPTION OF THE INVENTION

The following details one embodiment of the present invention, with reference to the drawings.

Embodiment 1

(1) Overall Configuration of Communication System

Figure 1:
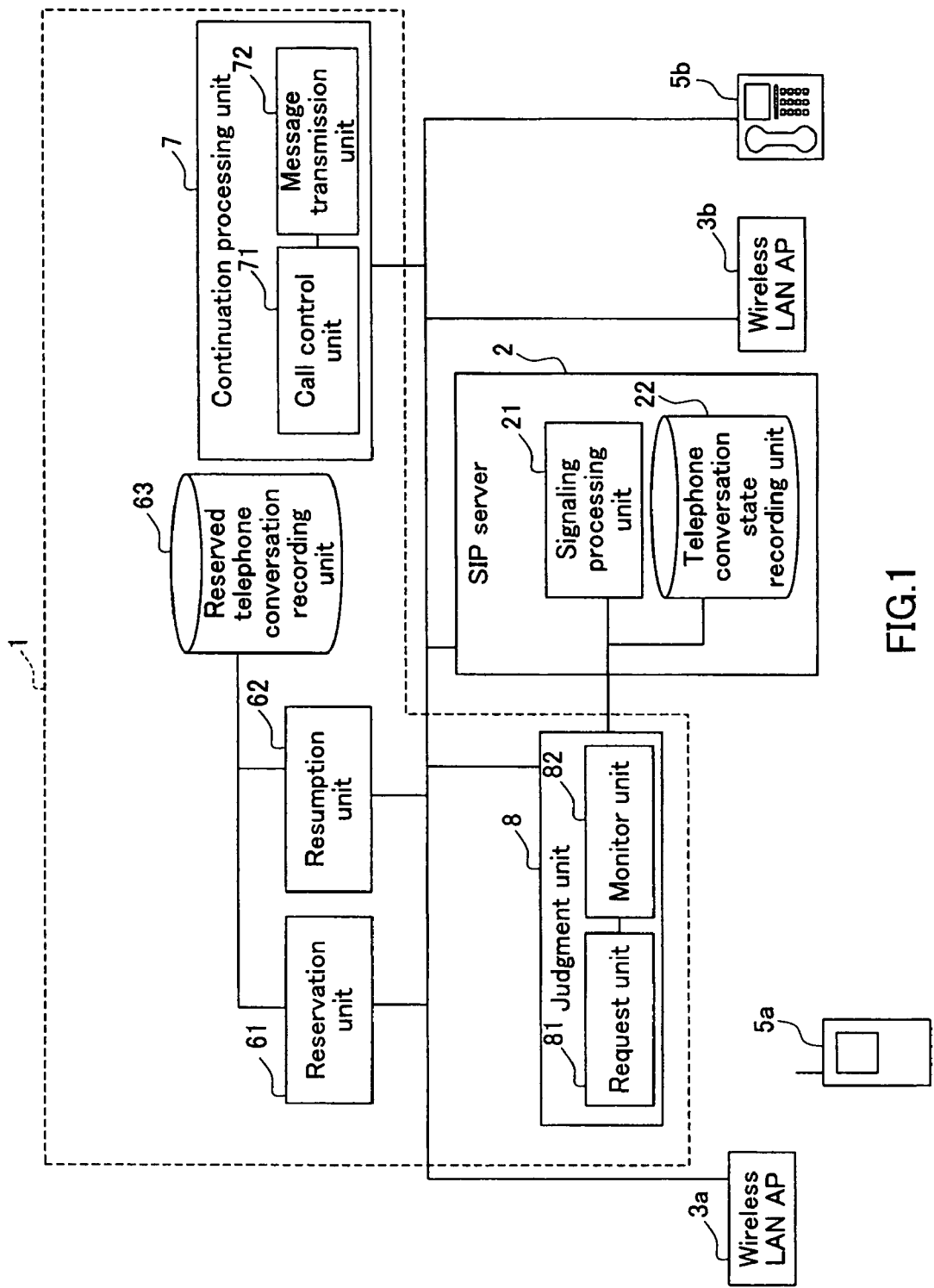
FIG. 1 is a functional block diagram showing the overall configuration of a communication system including a telephone conversation resumption system of Embodiment 1.

FIG. 1 is a functional block diagram showing the overall configuration of a communication system including a telephone conversation resumption system of the present embodiment. As shown in FIG. 1, the telephone conversation resumption system 1 includes a reservation unit 61, a resumption unit 62, a continuation processing unit 7 and a judgment unit 8. The reservation unit 61, the resumption unit 62, the continuation processing unit 7 and the judgment unit 8 are each connected with a SIP server 2 and wireless LAN access points (hereinafter called wireless LANAPs) 3a and 3b.

The SIP server 2 is a call control apparatus in an IP phone, which controls the generation and the completion of a call between telephone conversation terminals for an IP phone. The telephone conversation terminals to be controlled by the SIP server 2 include a portable terminal 5a that communicates via wireless LAN and a stationary terminal 5b that communicates via a wire network. The SIP server 2 is connected with a plurality of wireless LANAPs 3a and 3b and the stationary terminal 5b. The stationary terminal 5b may be a stationary type IP phone, for example. The wireless LANAPs 3a and 3b communicate with the portable terminal 5a located within their wireless communication area, thereby relaying the communication between the portable terminal 5a and the SIP server 2 or other telephone conversation terminals. Thus, the portable terminal 5a communicates with the SIP server 2 and the stationary terminal 5b via the wireless LANAP 3a or 3b.

Note here that FIG. 1 illustrates one portable terminal 5a and one stationary terminal 5b as the examples of the telephone conversation terminals. However, in the actual communication system, a plurality of portable terminals and a plurality of stationary terminals will be subjected to the call control by the SIP server 2.

The SIP server 2 and the telephone conversation resumption system 1 may be constructed on a computer such as a server machine, a personal computer or a workstation. Each of the SIP server 2 and the reservation unit 61, the resumption unit 62, the continuation processing unit 7 and the judgment unit 8 of the telephone conversation resumption system 1 may be configured on one computer or to be distributed over a plurality of computers.

The respective functions of the SIP server 2 and the reservation unit 61, the resumption unit 62, the continuation processing unit 7 and the judgment unit 8 of the telephone conversation resumption system 1 can be implemented by executing a predetermined program by a CPU of a computer. Therefore, programs for executing the functions of the reservation unit 61, the resumption unit 62, the continuation processing unit 7 and the judgment unit 8 as well as a recording medium for recording the programs therein also are embodiments of the present invention. At least one of the programs for executing the functions of the reservation unit 61, the resumption unit 62, the continuation processing unit 7 and the judgment unit 8 may be a module included in a program for executing the function of the SIP server.

For instance, in the case where a telephone conversation is carried out between the portable terminal 5a and the stationary terminal 5b, the portable terminal 5a or the stationary terminal 5b requests the SIP server 2 to generate a call for starting the telephone conversation. The SIP server 2 receiving the request generates a call between the portable terminal 5a and the stationary terminal 5b.

In the telephone conversation after the call is generated, audio data is directly transmitted/received between the portable terminal 5a and the stationary terminal 5b without the SIP server 2 intervening therebetween. When the telephone conversation is completed, the portable terminal 5a or the stationary terminal 5b requests the SIP server 2 to complete the call. The SIP server 2 receiving the request completes the call between the portable terminal 5a and the stationary terminal 5b. Thereby the telephone conversation can be completed normally. In the present embodiment, data concerning the generation and the completion of a call is exchanged between the SIP server and the communication terminal in accordance with a Session initiation protocol (SIP).

The SIP server 2 includes a signaling processing unit 21 and a telephone conversation state recording unit 22. In the telephone conversation state recording unit 22, data concerning the telephone conversation terminals in a telephone conversation and concerning the telephone conversation are recorded. For instance, a telephone conversation identifier for identifying the telephone conversation, terminal identifiers for identifying telephone conversation terminals on both ends of the telephone conversation, data showing the telephone conversation state and the like are recorded in the telephone conversation state recording unit 22 so as to be associated with each telephone conversation.

The signaling processing unit 21 receives a life/death monitoring message that is regularly transmitted from a portable terminal in a telephone conversation. The life/death monitoring message is a message for confirming the communication state of the portable terminal regularly, and is transmitted from the portable terminal to the signaling processing unit 21 via the wireless LANAP 3a.

In the case where the portable terminal 5a, which has been unable to communicate with the wireless LANAP 3a, becomes possible to communicate with the wireless LANAP 3a within its communication area, the portable terminal 5a transmits a terminal registration message to the signaling processing unit 21. The terminal registration message is a message for notifying the SIP server 2 that the portable terminal 5a is able to communicate within the communication area of the wireless LANAP 3a.

Although the SIP server 2 has other functions in addition to the functions provided by the signaling processing unit 21 and the telephone conversation state recording unit 22, the descriptions thereof are omitted in the present embodiment.

(2) Configuration of Telephone Conversation Resumption System

In the telephone conversation resumption system 1, the judgment unit 8 includes a request unit 81 and a monitor unit 82. The continuation processing unit 7 includes a call control unit 71 and a message transmission unit 72.

In the judgment unit 8, the monitor unit 82 monitors a life/death monitoring message that is transmitted from a portable terminal in a telephone conversation to the signaling processing unit 21. Thereby, the monitor unit 82 detects deterioration of the communication state between the portable terminal in a telephone conversation and the wireless LANAP, thus causing communication impossibility. The following exemplifies the case where in the middle of the telephone conversation between a portable terminal 5a and a stationary terminal 5b, the communication state between the portable terminal 5a and the wireless LANAP 3a deteriorates to make it impossible to communicate.

When the monitor unit 82 detects the communication impossibility between the portable terminal 5a in a telephone conversation and the wireless LANAP 3a, the request unit 81 requests the reservation unit 61 to conduct a reservation processing of telephone conversation resumption of the portable terminal 5a. At this time, the request unit 81 reads a terminal identifier of the portable terminal 5a and a telephone conversation identifier indicating the telephone conversation between the portable terminal 5a and the stationary terminal 5b from the telephone conversation state recording unit 22, and passes them to the reservation unit 61.

The reservation unit 61 that receives the request for a reservation processing of telephone conversation resumption of the portable terminal 5a reads the terminal identifier of the stationary terminal 5b from the telephone conversation state recording unit 22. The reservation unit 61 records, in a reserved telephone conversation recording unit 63, the terminal identifier of the portable terminal 5a, the terminal identifier of the stationary terminal 5b and the telephone conversation identifier indicating the telephone conversation between the portable terminal 5a and the stationary terminal 5b as data indicating the telephone conversation for which resumption is reserved.

At the same time, the reservation unit 61 requests the call control unit 71 of the continuation processing unit 7 to take over the telephone conversation. The reservation unit 61 requests the call control unit 71 to take over the telephone conversation between the portable terminal 5a that has become impossible to communicate and the stationary terminal 5b. At this time, the reservation unit 61 passes the terminal identifier of the portable terminal 5a, the terminal identifier of the stationary terminal 5b and the conversation identifier indicating the telephone conversation between the portable terminal 5a and the stationary terminal 5b, which have been passed from the request unit 8, to the call control unit 71.

When receiving the request for a takeover of the telephone conversation from the reservation unit 61, the call control unit 71 requests the SIP server 2 to generate a call between the continuation processing unit 7 and the stationary terminal 5b. The SIP server 2 generates a call between the continuation processing unit 7 and the stationary terminal 5b. Thereby, the telephone conversation between the portable terminal 5a and the stationary terminal 5b can be taken over as a telephone conversation between the stationary terminal 5b and the continuation processing unit 7.

When the call between the continuation processing unit 7 and the stationary terminal 5b is generated, the message transmission unit 72 transmits an audio message representing the communication state and an operational instruction to the stationary terminal 5b. Thereby, a speaker of the stationary phone 5b can know the communication state and the operation to be conducted next.

When the communication state between the portable terminal 5a and the wireless LANAP 3a recovers, the portable terminal 5a transmits a terminal registration message to the signaling processing unit 21 of the SIP server 2. The signaling processing unit 21 passes the terminal registration message to the monitor unit 82. Thereby, the monitor unit 82 detects that the communication state between the wireless LANAP 3a and the portable terminal 5a has recovered.

When the monitor unit 82 detects that the communication state between the wireless LANAP 3a and the portable terminal 5a has recovered, the request unit 81 passes data indicating the recovery of the communication state to the resumption unit 62. The resumption unit 62 receiving the data indicating the recovery of the communication state requests the SIP server 2 to generate a call for resuming the telephone conversation between the portable terminal 5a and the stationary terminal 5b. At this time, the resumption unit 62 transmits the terminal identifier of the portable terminal 5a and the terminal identifier of the stationary terminal 5b to the SIP server 2. The SIP server 2 generates a call between the portable terminal 5a and the stationary terminal 5b. Thereby, transmission/reception of an audio message becomes possible between the portable terminal 5a and the stationary terminal 5b, so that a telephone conversation is resumed.

Figure 2:
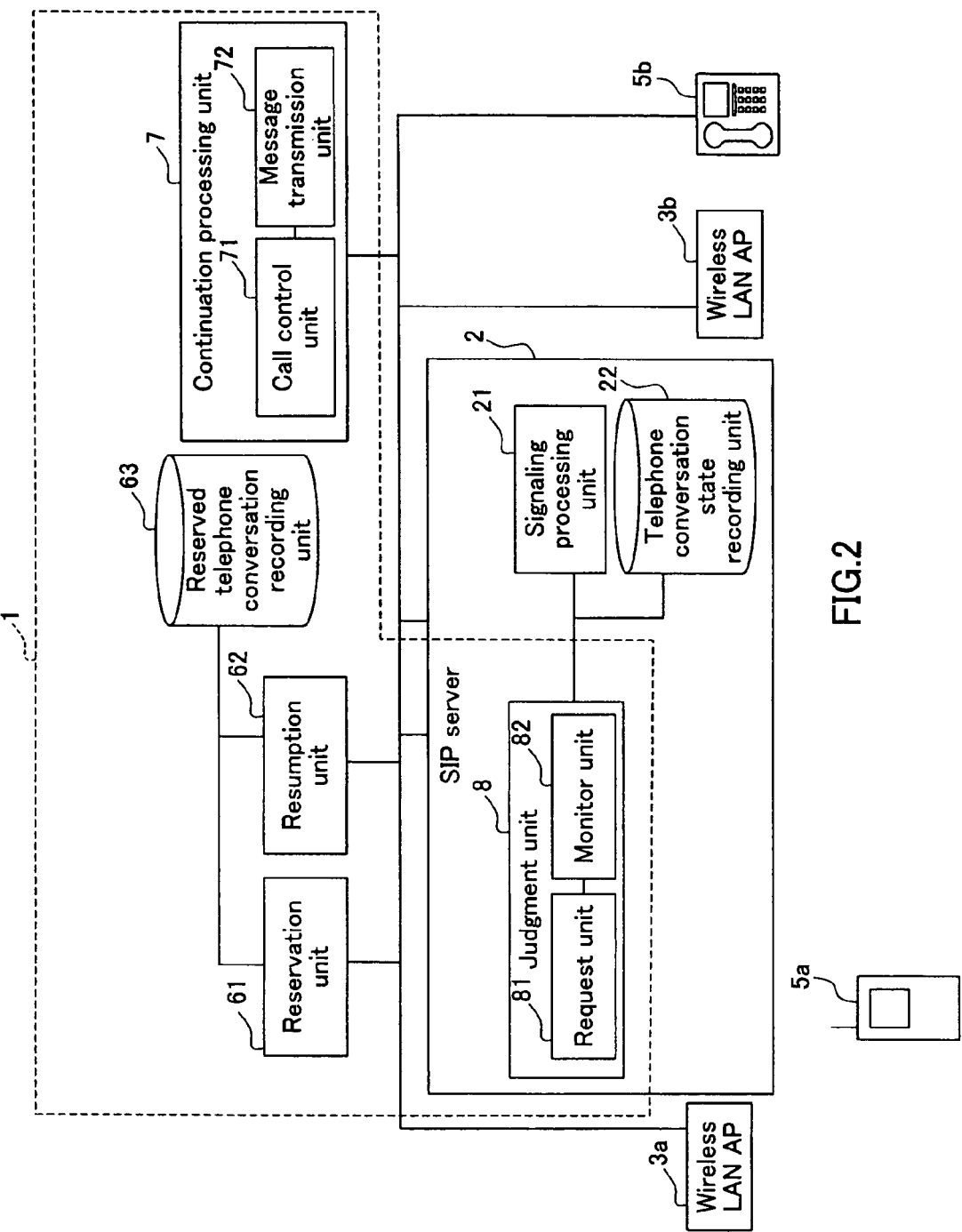
FIG. 2 is a functional block diagram showing the configuration where a judgment unit is provided in a SIP server.

Note here that the configuration of the telephone conversation resumption system 1 is not limited to the example of FIG. 1. For instance, at least one of the functions of the judgment unit 8, the reservation unit 61, the resumption unit 62 and the continuation processing unit 7 may be configured as a functional block provided in the SIP server 2. FIG. 2 exemplifies a functional block diagram showing the configuration where the judgment unit 8 is provided in the SIP server 2.

Figure 3:
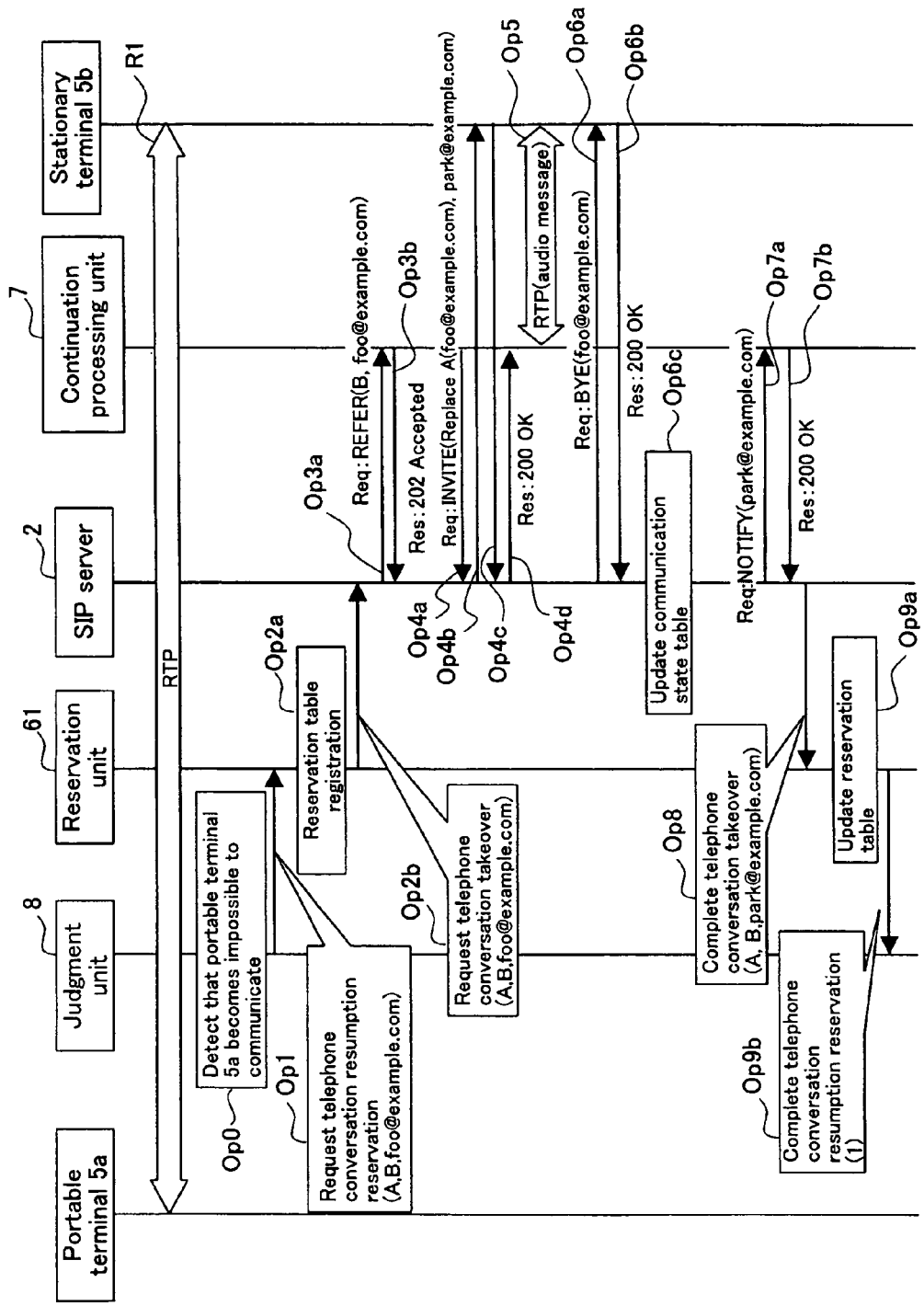
FIG. 3 is a sequence diagram showing the flow of a processing to reserve telephone conversation resumption.

(3) Operation Example of Telephone Conversation Resumption System (3-1) Telephone Conversation Continuation Processing FIG. 3 is a sequence diagram showing the flow of a processing by the telephone conversation resumption system 1 to reserve telephone conversation resumption after communication impossibility of a portable terminal is detected. FIG. 3 shows, as one example, the processing conducted when, in a telephone conversation between the portable terminal 5a and the stationary terminal 5b, the communication between the portable terminal 5a and the wireless LANAP 3a has become impossible.

The telephone conversation between the portable terminal 5a and the stationary terminal 5b is carried out by transmitting/receiving audio data in accordance with Realtime Transport Protocol (RTP) (R1). For instance, in the case where the portable terminal 5a in a telephone conversation within a communication area of the wireless LANAP 3a moves outside the communication area, the communication state between the wireless LANAP 3a and the portable terminal 5a deteriorates, thus making it impossible to communicate with the wireless LANAP 3a. In such a case, the judgment unit 8 detects that the portable terminal 5a has become impossible to communicate (Op0). The details of the processing for detecting the communication impossibility will be described later.

When the judgment unit 8 detects the communication impossibility of the portable terminal 5a due to the deterioration of the communication state, the judgment unit 8 requests the reservation unit 61 to reserve telephone conversation resumption between the portable terminal 5a and the stationary terminal 5b (Op1). At this time, the judgment unit 8 acquires the terminal identifier of the portable terminal 5a, the terminal identifier of the stationary terminal 5b and the telephone conversation identifier indicating the telephone conversation between the portable terminal 5a and the stationary terminal 5b from the telephone conversation state recording unit 22 of the SIP server 2, and transmits them to the reservation unit 61. The following describes a specific example where the terminal identifier of the portable terminal 5a is "A", the terminal identifier of the stationary terminal 5b is "B", and the telephone conversation identifier is "fooEexample.com".

Note here that the data passed from the judgment unit 8 to the reservation unit 61 is not limited to the above-stated example. For instance, the judgment unit 8 may pass only the telephone conversation identifier indicating the telephone conversation between the portable terminal 5a and the stationary terminal 5b to the reservation unit 61.

When the reservation unit 61 receives the request for reserving telephone conversation resumption from the judgment unit 8, the reservation unit 61 records, in the reserved telephone conversation recording unit 63, the terminal identifier "A" of the portable terminal 5a, the terminal identifier "B" of the stationary terminal 5b and the telephone conversation identifier "foo@example.com" of the telephone conversation between the portable terminal 5a and the stationary terminal 5b (Op2a).

FIG. 5A and FIG. 5B show specific examples of data recorded in the reserved telephone conversation recording unit 63. In the examples of FIG. 5A and FIG. 5B, data indicating a telephone conversation for which resumption is to be reserved is recorded in a reservation table 64. In the reservation table 64, a reservation ID of a telephone conversation for which resumption is to be reserved, a reserved terminal, the other-end terminal that is a terminal of a party on the other end of the reserved terminal and a telephone conversation identifier indicating a continuing telephone conversation are recorded so as to be associated with one another. The reservation ID is information for identifying the reservations, which is generated and recorded by the reservation unit 61 when data for which resumption is to be reserved is newly registered in the reservation table.

FIG. 5A shows exemplary data recorded by the reservation unit 61 at Op2a. At Op2a, "1" is recorded as the reservation ID, the terminal identifier "A" of the portable terminal 5a is recorded as the reservation terminal, the terminal identifier "B" of the stationary terminal 5b is recorded as the other-end terminal and "foo@example.com" is recorded as the telephone conversation identifier.

Further, the reservation unit 61 requests the SIP server 2 to take over the telephone conversation (Op2*b*). At this time, the reservation unit 61 transmits the terminal identifier "A" of the portable terminal 5*a*, the terminal identifier "B" of the stationary terminal 5*b* and the telephone conversation identifier "foo@example.com" of the telephone conversation between the portable terminal 5*a* and the stationary terminal 5*b* to the SIP server 2.

When receiving the request for takeover of the conversation from the reservation unit 61, the SIP server 2 requests the continuation processing unit 7 to take over the telephone conversation (Op3*a*). This request is implemented by transmitting a takeover request message from the SIP server 2 to the continuation processing unit 7. This takeover request message is a message in accordance with the SIP. Note here that messages transmitted at the following Op3*b*, Op4*a* to 4*d*, Op6*a*, Op6*b*, Op7*a* and Op7*b* also are messages in accordance with the SIP.

The takeover request message transmitted from the SIP server 2 to the continuation processing unit 7 at Op3*a* contains the telephone conversation identifier "foo@example.com" indicating the telephone conversation to be taken over and the terminal identifier "B" indicating the other-end terminal of a party on the other end who takes over the telephone conversation.

The notation "Req:REFER (B, foo@example.com)" at Op3*a* of FIG. 3 represents a transmitted message. "Req" represents a request message, and "REFER" represents that a method included in the message is a REFER method. The notation within ( ) indicates that the data contained in the message are "B" and "foo@example.com". The REFER method is a method for instructing the continuation processing unit 7 to take over the telephone conversation represented by the telephone conversation identifier "foo@example.com" performed by the stationary terminal 5*b* represented by the terminal identifier "B".

When receiving from the SIP server 2 a request for generating a call for takeover, the continuation processing unit 7 transmits to the SIP server 2 a response message (denoted by "Res: 202 Accepted") indicating that the request has been accepted (Op3*b*). In the notation of the response message, Res represents a response message, "202" represents a response code and "Accepted" represents that the request has been accepted.

Further, the continuation processing unit 7 refers to the terminal identifier "B" contained in the takeover request message from the SIP server 2. The continuation processing unit 7 transmits a call generation request message for generating a call with the stationary terminal 5*b* represented by the terminal identifier "B" to the stationary terminal 5*b* (Op4*b*) via the SIP server 2 (Op4*a*). This call generation request message contains the telephone conversation identifier "foo@example.com" of the telephone conversation to be taken over and a telephone conversation identifier "park@example.com" representing a telephone conversation after takeover (hereinafter called a continuation telephone conversation identifier). The continuation telephone conversation identifier is generated by the continuation processing unit 7 when the call generation request message is transmitted. This call generation request message is denoted by "Req: INVITE (Replace A (foo@example.com), park@example.com)" in FIG. 3. This INVITE message means to request the stationary terminal 5*b* to substitute the telephone conversation (telephone conversation identifier: "foo@example.com") being carried out with the portable terminal 5*a* represented by the terminal identifier "A" with the telephone conversation (telephone conversation identifier: "park@example.com") carried out with an originator of the message (in this case, the continuation processing unit 7).

The stationary terminal 5*b* transmits a response message "Res:200 OK" indicating that the call generation request is accepted via the SIP server 2 (Op4*c*) to the continuation processing unit 7 (Op4*d*).

Thereby, a call for starting a telephone conversation between the stationary terminal 5*b* and the continuation processing unit 7 is generated. As a result, the telephone conversation between the portable terminal 5*a* and the stationary terminal 5*b* is taken over by the stationary terminal 5*b* and the continuation processing unit 7.

When the call for starting a telephone conversation between the stationary terminal 5*b* and the continuation processing unit 7 is generated, the continuation processing unit 7 transmits an audio message to the stationary terminal 5*b* (Op5). As this audio message, a message recorded beforehand in the continuation processing unit 7 can be used. The audio message is transmitted in accordance with RTP. The audio message contains information indicating that the communication state with the portable terminal 5*a* deteriorates and information indicating operational instructions to a speaker of the stationary terminal 5*b*, for example. Thereby, the speaker of the stationary terminal 5*b* can be informed of the communication state and the operational instructions.

Examples of the operational instructions to the speaker of the stationary terminal 5*b* include an instruction of standby without hanging up the telephone call and an instruction of hanging up the telephone call and being on standby. Further, immediately after the detection of the communication impossibility of the portable terminal 5*a*, the continuation processing unit 7 may transmit an audio message for instructing of standby without hanging up the telephone call to the stationary terminal 5*b*, and when a predetermined time has elapsed after the detection of the communication impossibility, the continuation processing unit 7 may transmit an audio message for instructing of hanging up the telephone call and being on standby. Note here that the message transmitted to the stationary terminal 5*b* is not limited to an audio message and may be a message represented by characters, still images, moving images and the like.

When the call for starting a telephone conversation between the stationary terminal 5*b* and the continuation processing unit 7 is generated normally, the SIP server 2 transmits a call completion message for completing the telephone conversation between the portable terminal 5*a* and the stationary terminal 5*b* (Op6*a*). A response message indicating that the completion of the telephone conversation is accepted is transmitted from the stationary terminal 5*b* to the SIP server 2 (Op6*b*). Thereby, the telephone conversation between the portable terminal 5*a* and the stationary terminal 5*b* is completed. Note here that the telephone conversation between the stationary terminal 5*b* and the continuation processing unit 7 is continued at this time.

When the telephone conversation between the portable terminal 5*a* and the stationary terminal 5*b* is completed, the SIP server 2 updates data recorded in the telephone conversation state recording unit 22 (Op6*c*).

FIGS. 6A, B and C show specific examples of data recorded in the telephone conversation state recording unit 22. In the examples of FIGS. 6A, B and C, a communication state is recorded in a telephone conversation state table 65. On the telephone conversation state table 65, a caller, a callee and a telephone conversation identifier for identifying a telephone conversation are recorded for each telephone conversation.

Note here that the data recorded in the telephone conversation state table 65 is not limited to the examples of FIGS.

6A, B and C. For instance, data indicating a state of the telephone conversation and data indicating a telephone conversation time further may be recorded therein.

FIG. 6A shows data recorded in the telephone conversation state table 65 prior to the updating at Op6*c*. On the telephone conversation state table 65, the terminal identifier "B" of the stationary terminal 5*b* is recorded as the caller, the terminal identifier "A" of the portable terminal 5*a* is recorded as the callee and "foo@example.com" is recorded as the telephone conversation identifier. FIG. 6B shows data recorded in the telephone conversation state table 65 after the updating by the SIP server 2 at Op6*c*. At Op6*c*, the telephone conversation between the stationary terminal 5*b* and the portable terminal 5*a* has been completed, and instead the telephone conversation between the stationary terminal 5*b* and the continuation processing unit 7 is started. Thus, on the telephone conversation state table 65, the terminal identifier "B" of the stationary terminal 5*b* is recorded as the caller, the terminal identifier "PS" of the continuation processing unit 7 is recorded as the callee and the continuation telephone conversation identifier "park@example.com" indicating the telephone conversation between the stationary terminal 5*b* and the continuation processing unit 7 is recorded as the telephone conversation identifier.

The SIP server 2 notifies the continuation processing unit 7 of the continuation telephone conversation identifier indicating the telephone conversation between the stationary terminal 5*b* and the continuation processing unit 7 that has been started by the processing of Op4*a* to 4*d* (Op7*a*). The continuation processing unit 7 transmits a response message in response to the notification to the server 2 (Op7*b*).

The SIP server 2 notifies the reservation unit 61 that the takeover of the telephone conversation has been completed (Op8). This notification contains the terminal identifier "A" of the portable terminal 5*a* that is the caller of the original telephone conversation before the takeover, the terminal identifier "B" of the stationary terminal 5*b* as the callee and the continuation telephone conversation identifier "park@example.com" indicating the telephone conversation taken over.

When receiving the notification at Op8, the reservation unit 61 updates the reservation table 64 of the reserved telephone conversation recording unit 63 in accordance with the content of the notification (Op9*a*). FIG. 5B shows an example of the reservation table 64 updated at Op9*a*. On the reservation table 64 of FIG. 5B, a telephone conversation identifier of a telephone conversation between the portable terminal 5*a* having the terminal identifier "A" and the stationary terminal 5*b* having the terminal identifier "B" is updated from "foo@example.com" to the continuation telephone conversation identifier "park@example.com" indicating a telephone conversation between the stationary terminal 5*b* and the continuation processing unit 7. Thereby, it is recorded that the telephone conversation specified by the terminal identifiers "A" and "B" is taken over by the telephone conversation indicated by the continuation telephone conversation identifier "park@example.com".

The reservation unit 61 transmits to the judgment unit 8 a response message indicating that the reservation of the telephone conversation resumption has been completed (Op9*b*). This response message is the response to the request of the telephone conversation resumption reservation from the judgment unit 8 (Op1). This response message contains a reservation ID "1" recorded in the reservation table 64. The judgment unit 8 records the received reservation ID "1" on a recording medium that the judgment unit 8 can access.

In this way, even when the communication between the portable terminal 5*a* and the wireless LANAP 3*a* becomes impossible, the telephone conversation between the portable terminal 5*a* and the stationary terminal 5*b* can be taken over by the telephone conversation between the continuation processing unit 7 and the stationary terminal 5*b* in accordance with the sequence of FIG. 3. Then, an audio message is transmitted from the continuation processing unit 7 to the stationary terminal 5*b*. Further, data for resuming the telephone conversation between the portable terminal 5*a* and the stationary terminal 5*b* is recorded on the reserved telephone conversation recording unit 63.

Figure 4:
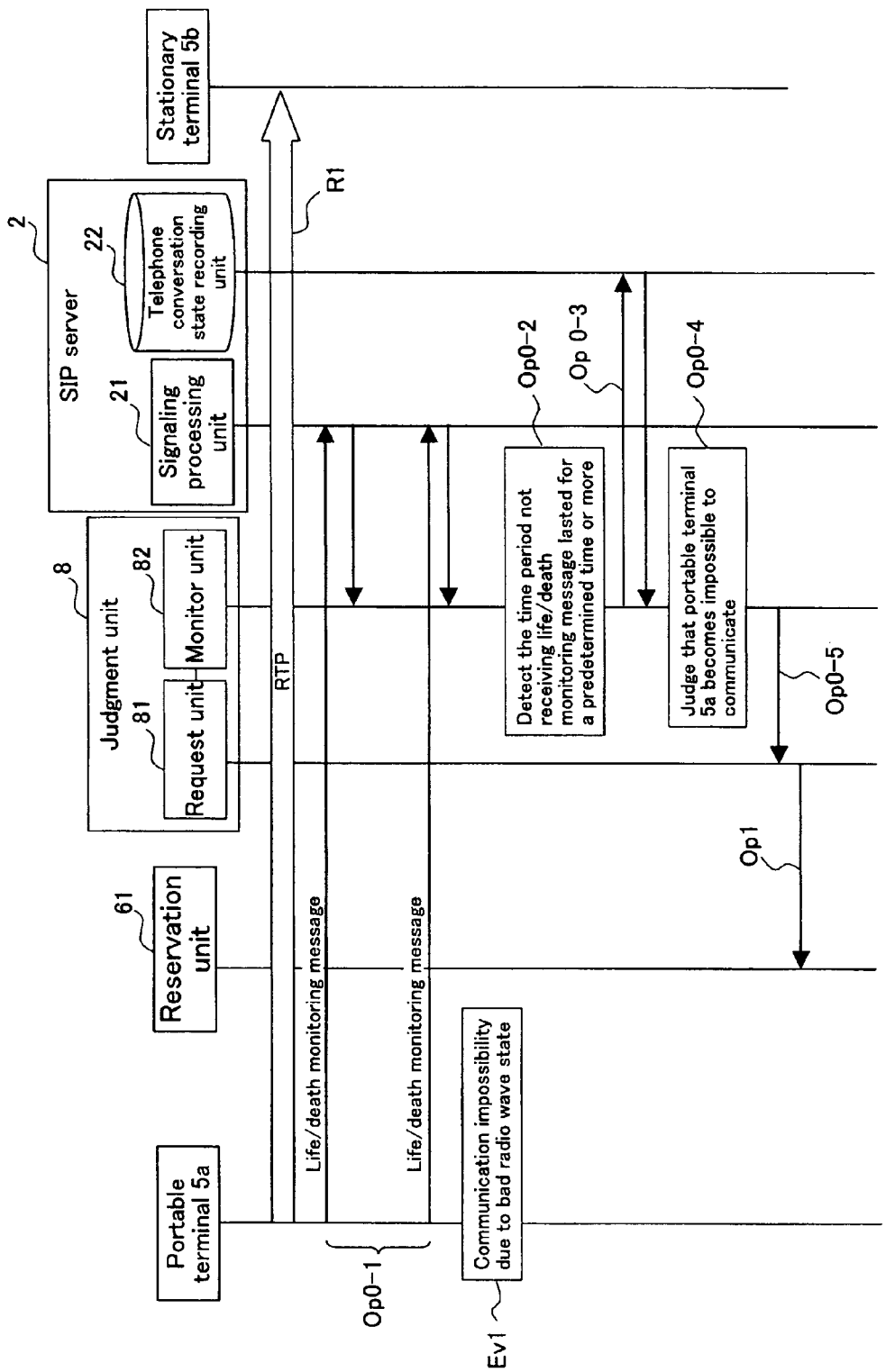
FIG. 4 is a sequence diagram showing an exemplary processing to detect communication impossibility of a portable terminal.

(3-1-A) Processing for Detecting Communication Impossibility of Portable Terminal FIG. 4 is a sequence diagram showing an exemplary processing to detect communication impossibility of a portable terminal (Op0 of FIG. 3). FIG. 4 shows as one example the processing conducted when in a telephone conversation between the portable terminal 5*a* and the stationary terminal 5*b*, the communication between the portable terminal 5*a* and the wireless LANAP 3*a* becomes impossible.

The telephone conversation between the portable terminal 5*a* and the stationary terminal 5*b* is carried out by transmitting/receiving audio data in accordance with RTP (R1).

In parallel with the transmission/reception of audio data, the portable terminal 5*a* always transmits a life/death monitoring message at constant time intervals to the signaling processing unit 21 of the SIP server 2 (Op0-1). The life/death monitoring message is transmitted to the signaling processing unit 21 via the wireless LANAP 3*a*. Every time the signaling processing unit 21 receives a life/death monitoring message, the signaling processing unit 21 transmits the received life/death monitoring message to the monitor unit 82.

For instance, in the case where the portable terminal 5*a* in a telephone conversation within a communication area of the wireless LANAP 3*a* moves outside the communication area, the communication state between the wireless LANAP 3*a* and the portable terminal 5*a* deteriorates, thus making it impossible to communicate with the wireless LANAP 3*a*. In such a case, since a life/death monitoring message cannot arrive at the wireless LANAP 3*a*, the signaling processing unit 21 will not receive a life/death monitoring message.

In the case where the monitor unit 82 detects that any life/death monitoring message has not been received for a predetermined time period or longer (Op0-2), the monitor unit 82 refers to the data in the telephone conversation state recording unit 22 of the SIP server 2 (Op0-3). The monitor unit 82 makes a judgment as to whether data indicating that the portable terminal 5*a* is busy is recorded or not in the telephone conversation state recording unit 22. If the data indicating that the portable terminal 5*a* is busy is recorded in the telephone conversation state recording unit 22, the monitor unit 82 judges that the communication between the portable terminal 5*a* and the wireless LANAP 3*a* becomes impossible (Op0-4). That is to say, if any life/death monitoring message has not been sent from the portable terminal 5*a* for a predetermined time period or longer, and the portable terminal 5*a* is busy, it is judged that the communication becomes impossible due to deterioration of a communication state between the portable terminal 5*a* and the wireless LANAP 3*a*.

The monitor unit 82 passes the data indicating that the portable terminal 5*a* has become impossible to communicate to the request unit 81 (Op0-5). The request unit 81 transmits a message for requesting the continuation of the telephone conversation to the reservation unit 61 (Op1). The processing at Op1 is similar to the processing at Op1 of FIG. 3.

(3-2) Telephone Conversation Resumption Processing

Figure 7:
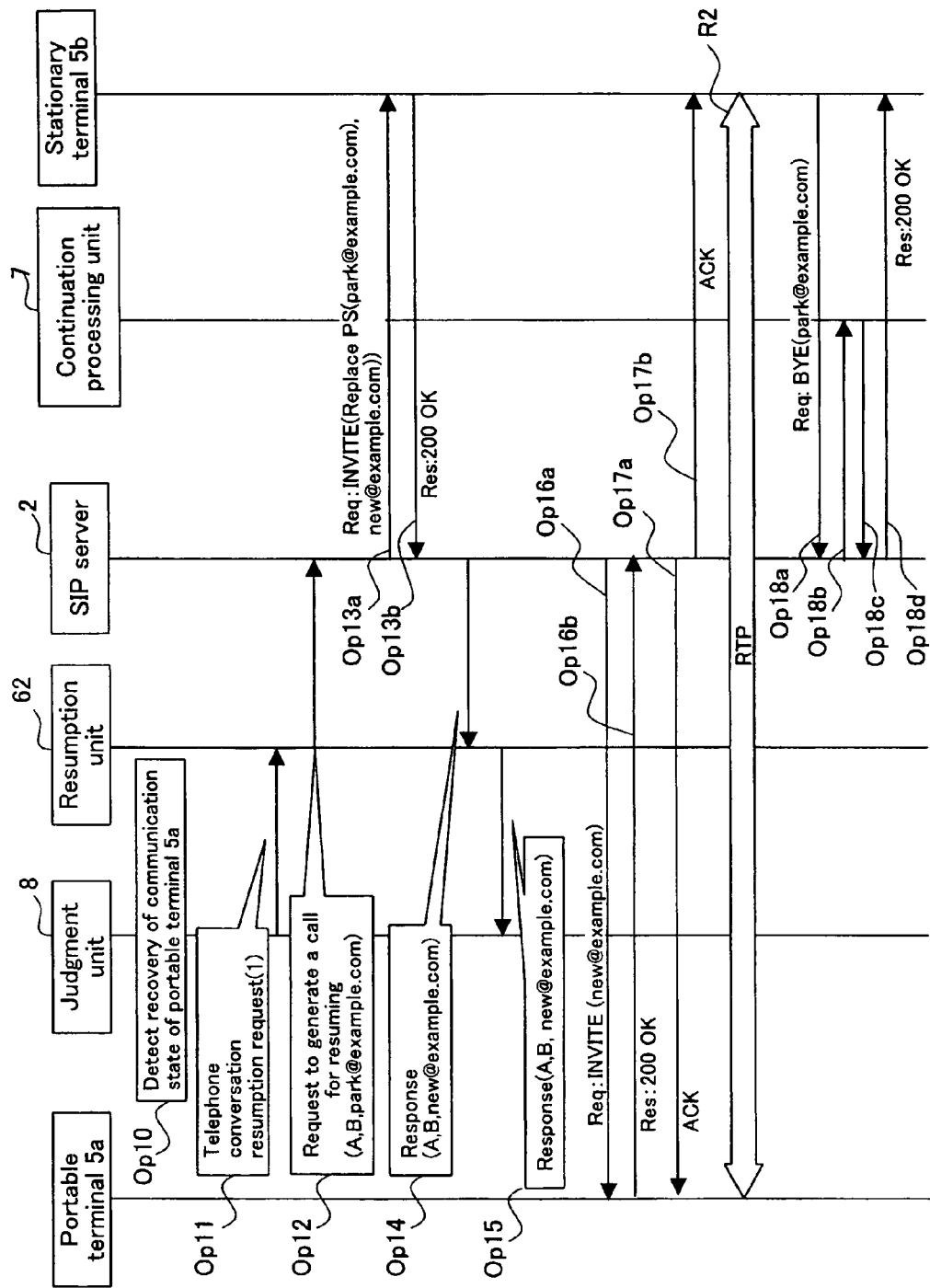
FIG. 7 is a sequence diagram showing the flow of a processing by a telephone conversation resumption system 1 to resume a telephone conversation.

FIG. 7 is a sequence diagram showing the flow of a processing by the telephone conversation resumption system 1 to resume a telephone conversation after the recovery of the communication state of a portable terminal is detected. FIG. 7 shows as one example the processing conducted in the case where after the processing of FIG. 3 is carried out, the communication state between the portable terminal 5a and the wireless LANAP 3a is recovered, and the telephone conversation between the portable terminal 5a and the stationary terminal 5b is resumed.

When the communication state between the portable terminal 5a and the wireless LANAP 3a recovers, the monitor unit 82 in the judgment unit 8 detects the recovery (Op10). The details of the processing for detecting the recovery of the communication state will be described later. When the recovery of the communication state of the portable terminal 5a is detected, the judgment unit 8 requests the resumption unit 62 to resume the telephone conversation (Op11). This request for the telephone conversation resumption contains the reservation ID "1". The reservation ID "1" is data included in the message transmitted from the reservation unit 61 to the judgment unit 8 at Op9b of FIG. 3.

When receiving the message to request the telephone conversation resumption, the resumption unit 62 requests the SIP server 2 to resume the telephone conversation between the portable terminal 5a and the stationary terminal 5b (Op12). At this time, the resumption unit 62 transmits the terminal identifier "A" of the portable terminal 5a, the terminal identifier "B" of the stationary terminal 5b and the continuation telephone conversation identifier "park@example.com" indicating the telephone conversation between the stationary terminal 5b and the continuation processing unit 7 to the SIP server 2.

The SIP server 2 requests the stationary terminal 5b to switch from the telephone conversation with the continuation processing unit 7 to the telephone conversation with the portable terminal 5a (Op13a). This request is implemented by transmitting a call switching request message. The call switching request message contains the continuation telephone conversation identifier "park@example.com" indicating the telephone conversation between the stationary terminal 5b and the continuation processing unit 7 and a resumption telephone conversation identifier "new@example.com" indicating the telephone conversation to be resumed. This resumption telephone conversation identifier is generated by the SIP server 2. The call switching request message is a message for generating a call between the portable terminal 5a and the stationary terminal 5b by a so-called 3rd Party Call. The 3rd Party Call refers to a scheme of generating a call by a third party other than the communication terminals on the both ends of a telephone conversation in order to start the telephone conversation by originating a call to the communication terminals on the both ends. This request message is denoted by "Req:INVITE (ReplaceA (park@example.com), new@example.com)" in FIG. 7.

Incidentally, in FIG. 7, messages transmitted at Op13a, Op13b, Op16a, Op16b, Op17a, Op17b and Op18a to Op18d are messages in accordance with the SIP.

The stationary terminal 5b transmits a response message indicating that the request can be accepted (Op13b). At Op14, the SIP server 2 transmits to the resumption unit 62 a response message in response to the request from the resumption unit 62. The response message contains the terminal identifier "A" of the portable terminal 5a, the terminal identifier "B" of the stationary terminal 5b and the resumption telephone conversation identifier "new@example.com" of a telephone conversation between the portable terminal 5a and the stationary terminal 5b, i.e., the telephone conversation to be resumed.

At Op15, the resumption unit 62 transmits to the judgment unit 8 a response message in response to the telephone conversation resumption request from the judgment 8. The response message contains "A", "B", and "new@example.com" in a similar manner to the response message at Op14.

Further, the SIP server 2 transmits to the portable terminal 5a a call generation request message for resuming the telephone conversation between the portable terminal 5a and the stationary terminal 5b (Op16a). This request message contains INVITE method and the resumption telephone conversation identifier "new@example.com" indicating the telephone conversation to be resumed. The portable terminal 5a transmits to the SIP server 2 a response message indicating that the request can be accepted (Op16b). Thereby, a call for resuming the telephone conversation between the portable terminal 5a and the stationary terminal 5b is generated.

The SIP server 2 updates data in the telephone conversation state recording unit 22. FIG. 6B shows exemplary data of the telephone conversation state table 65 prior to the updating, and FIG. 6C shows exemplary updated data after Op16b. As shown in FIG. 6C, after the updating at Op16b, the terminal identifier "B" of the stationary terminal 5b is recorded as a caller, the terminal identifier "A" of the portable terminal 5a is recorded as a callee and the resumption telephone conversation identifier "new@example.com" is recorded as the telephone conversation identifier in the telephone conversation state table 65.

When the SIP server 2 transmits an ACK message to the portable terminal 5a and the stationary terminal 5b (Op17a, 17b), audio data is transmitted/received between the portable terminal 5a and the stationary terminal 5b in accordance with RTP (R2). That is to say, a telephone conversation is resumed between the portable terminal 5a and the stationary terminal 5b.

The stationary terminal 5b transmits to the SIP server 2 a request message for completing the call with the continuation processing unit 7 (Op18a). This completion request message contains BYE method and the continuation telephone conversation identifier "park@example.com" indicating a telephone conversation between the stationary terminal 5b and the continuation processing unit 7. The SIP server 2 transfers this completion request message to the continuation processing unit 7 (Op18b), receives from the continuation processing unit 7 a response message indicating that the completion of the call can be accepted (Op18c) and transfers the response message to the stationary terminal 5b (Op18d). Thereby, the call between the stationary terminal 5b and the continuation processing unit 7 is completed.

Figure 8:
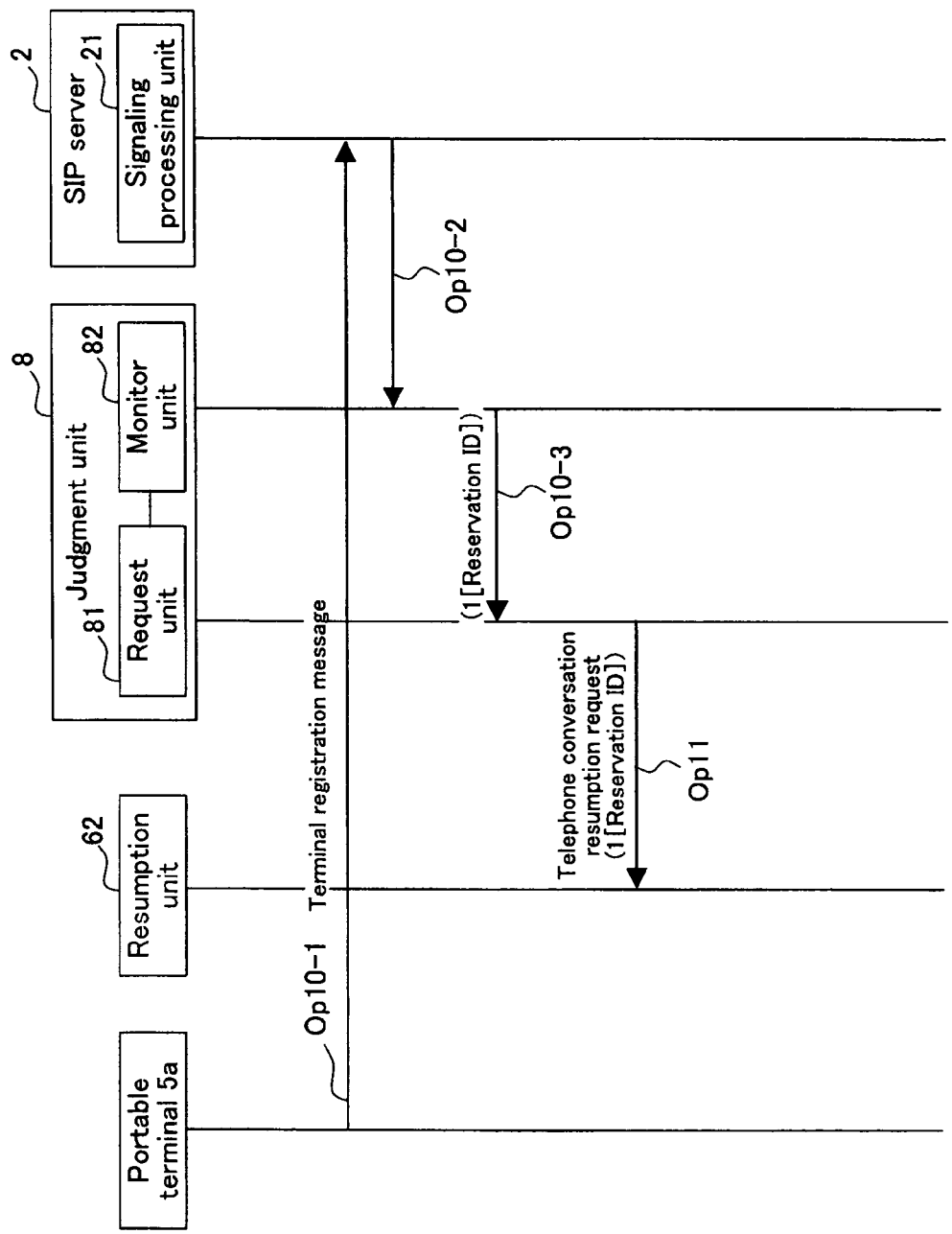
FIG. 8 is a sequence diagram showing an exemplary processing to detect the recovery of a communication state between a portable terminal and a wireless LANAP.

(3-2-A) Processing for Detecting the Recovery of Communication State of a Portable Terminal FIG. 8 is a sequence diagram showing an exemplary processing to detect the recovery of the communication state between a portable terminal and a wireless LANAP (Op10 of FIG. 7). FIG. 8 shows an exemplary processing conducted after the processing of FIG. 3. That is, FIG. 8 shows as one example the processing conducted when during a telephone conversation between the portable terminal 5a and the stationary terminal 5b, after the communication becomes impossible between the portable terminal 5a and the wireless LANAP 3a, the communication between the portable terminal 5a and the wireless LANAP 3b becomes possible.

For instance, as the portable terminal 5a moves, the communication between the portable terminal 5a and the wireless LANAP 3b becomes possible. Then, the portable terminal 5a transmits a terminal registration message to the signaling processing unit 21 of the SIP server 2 via the wireless LANAP 3b (Op10-1). The terminal registration message contains the terminal identifier of the portable terminal 5a that originated the terminal registration message. When receiving the terminal registration message, the signaling processing unit 21 transmits the terminal registration message to the monitor unit 82 (Op10-2).

When receiving the terminal registration message from the portable terminal 5a, the monitor unit 82 acquires the terminal identifier of the portable terminal 5a included in the terminal registration message. The judgment unit 8 refers to the reserved telephone conversation recording unit 63, and confirms whether the terminal identifier of the portable terminal 5a is recorded as the telephone conversation terminal for the telephone conversation to which the resumption has been reserved or not. If the terminal identifier of the portable terminal 5a is recorded as the telephone conversation terminal for the telephone conversation to which the resumption has been reserved, it is judged that the communication state of the portable terminal 5a, which has been impossible to communicate, has recovered. That is, if the terminal registration message is received from the portable terminal 5a and the portable terminal 5a is recorded in the reserved telephone conversation recording unit 63, the judgment unit 8 judges that the communication state between the portable terminal 5a and a wireless LANAP has recovered, thus becoming possible to communicate.

The monitor unit 82 acquires a reservation ID corresponding to the portable terminal 5a from the reserved telephone conversation recording unit 63. The monitor unit 82 passes data indicating that the portable terminal 5a has become possible to communicate together with the acquired reservation ID to the request unit 81 (Op10-3). The request unit 81 requests the resumption unit 62 to resume the telephone conversation (Op11). The processing of Op11 is similar to the processing of Op11 in FIG. 7.

That is the description of the operation example of the telephone conversation resumption system. As a result of the above-stated operations of FIGS. 3, 4, 7 and 8, even when the portable terminal becomes impossible to communicate during a telephone conversation, the other-end terminal can be informed of the situation. In addition, when the communication state of the portable terminal recovers, the telephone conversation with the other-end terminal can be resumed. Note here that the operation of the telephone conversation resumption system 1 of the present invention is not limited to the above-stated operation example.

The present embodiment describes the example where the call control of the telephone conversation in IP phones is carried out in accordance with the SIP. However, the protocol used for the call control of IP phones is not limited to the SIP, and the same holds true for the following embodiments.

Embodiment 2

Figure 9:
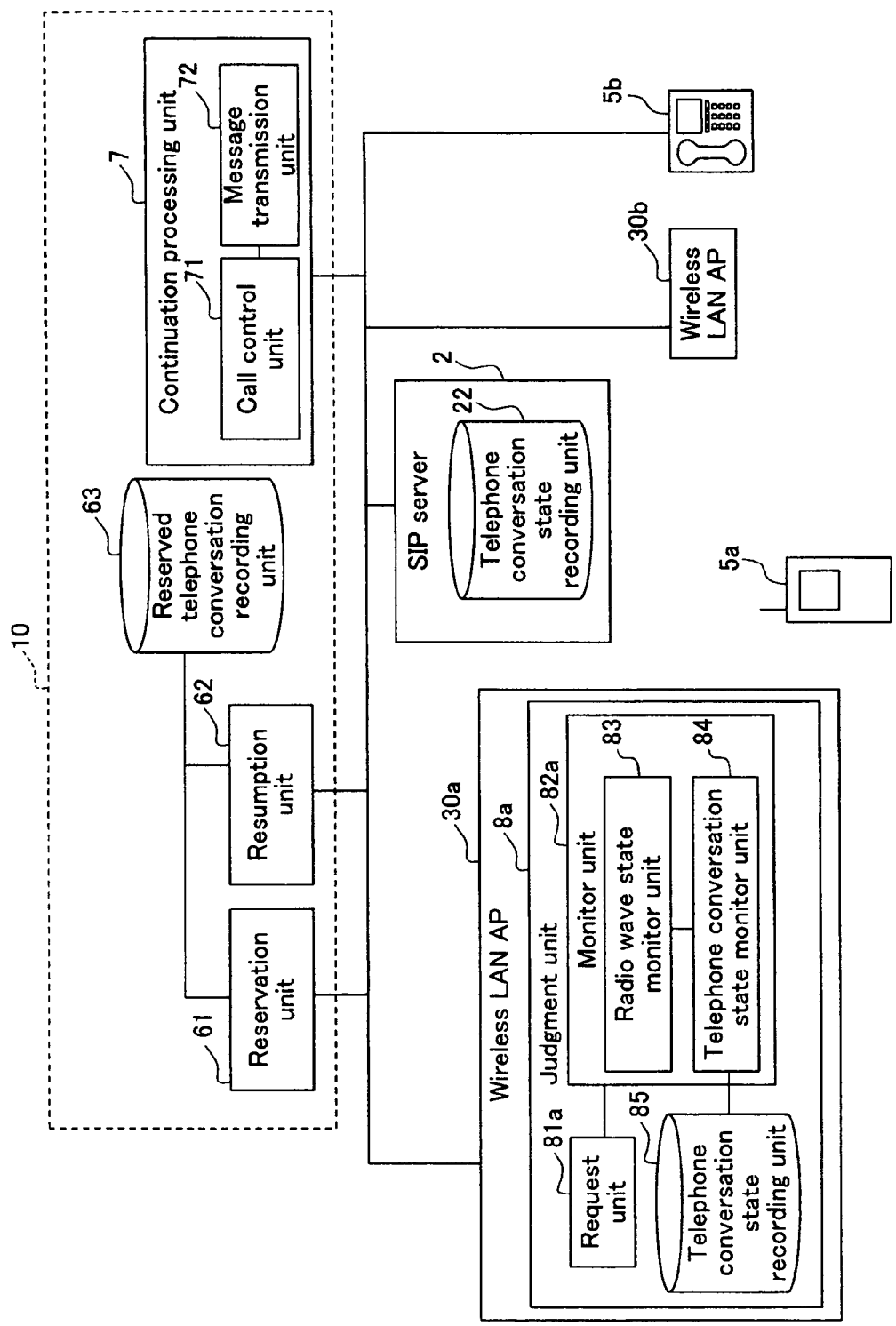
FIG. 9 is a functional block diagram showing the overall configuration of a communication system including a telephone conversation resumption system according to Embodiment 2.

FIG. 9 is a functional block diagram showing the overall configuration of a communication system including a telephone conversation resumption system according to the present embodiment. In FIG. 9, the same reference numerals are assigned to the same functional blocks as those of FIG. 1, and their explanations are not repeated. In the present embodiment, a judgment unit 8a is provided in wireless LANAPs 30a and 30b. In FIG. 9, the configuration of the judgment unit 8a is illustrated only in the wireless LANAP 30a, and the detailed configuration of the wireless LANAP 30b is omitted.

The judgment unit 8a receives a signal transmitted from a portable terminal 5a to the wireless LANAP 30a. The judgment unit 8a monitors the communication state between the portable terminal 5a and the wireless LANAP 30a based on this signal. In the case where the judgment unit 8a detects that the communication between the portable terminal 5a and the wireless LANAP 30a becomes impossible due to deterioration of a communication state, the judgment unit 8a transmits a message indicating such a state to a reservation unit 61. Further, when the judgment unit 8a detects that the communication state between the portable terminal 5a and the wireless LANAP 30a recovers, the judgment unit 8a transmits a message indicating such a state to a resumption unit 62.

The judgment unit 8a is provided with a request unit 81a, a monitor unit 82a and a telephone conversation state recording unit 85. The monitor unit 82a includes a radio wave state monitor unit 83 and a telephone conversation state monitor unit 84. The radio wave state monitor unit 83 monitors a state of radio wave for the wireless communication with the portable terminal 5a.

The telephone conversation state monitor unit 84 monitors a state of a telephone conversation performed via the wireless LANAP 30a. The state of a telephone conversation monitored by the telephone conversation state monitor unit 84 is recorded in the telephone conversation state recording unit 85. In the telephone conversation state recording unit 85, data indicating a portable terminal in a telephone conversation via the wireless LANAP 30a, data indicating the other-end terminal of the telephone conversation, a telephone conversation identifier of the telephone conversation, a reservation ID and the like are recorded, for example.

The request unit 81a requests the reservation unit 61 to reserve telephone conversation resumption or resume a telephone conversation in accordance with the results monitored by the radio wave state monitor unit 83 and the telephone conversation state monitor unit 84.

Figure 10:
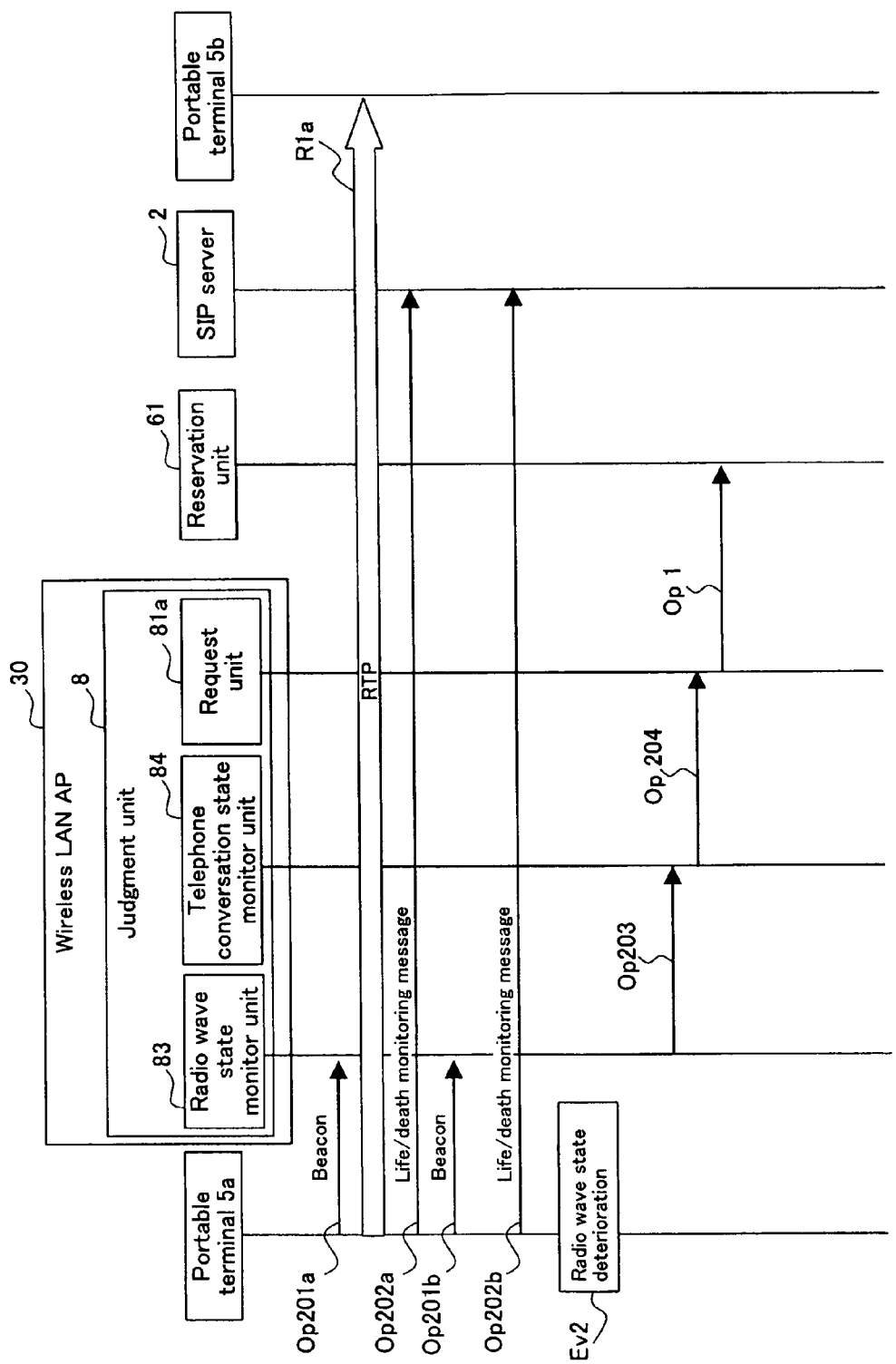
FIG. 10 is a sequence diagram showing an exemplary processing by a judgment unit to detect communication impossibility of a portable terminal.

FIG. 10 is a sequence diagram showing an exemplary processing by the judgment unit 8a to detect that the portable terminal 5a has become impossible to communicate. FIG. 10 shows, as one example, the processing conducted when the communication between the portable terminal 5a and the wireless LANAP 30a becomes impossible during a telephone conversation between the portable terminal 5a and the stationary terminal 5b.

The telephone-conversation between the portable terminal 5a and the stationary terminal 5b is implemented by transmitting/receiving audio data in accordance with RTP (R1a).

In parallel with the transmission/reception of audio data, the portable terminal 5a always transmits a beacon at constant time intervals to the wireless LANAP 30a (Op201a, Op201b). Further, the portable terminal 5a transmits a life/death monitoring message at constant time intervals to the SIP server 2 (Op202a, Op202b). The beacon is a signal defined by a layer of the wireless LAN, and the life/death monitoring message is a signal defined by a layer of the SIP. Normally, the time intervals for transmitting the beacon are shorter than the time intervals for transmitting the life/death monitoring message. Both of them can be used for monitoring the communication state between the portable terminal 5a and the wireless LANAP 3a. FIG. 10 describes an example where the radio wave state monitor unit 83 monitors the state of radio wave using a beacon.

For instance, in the case where the portable terminal 5a in a telephone conversation within a communication area of the wireless LANAP 30a moves outside the communication area, the communication state between the wireless LANAP 30a and the portable terminal 5a will deteriorate (Ev2). In such a case, the beacon and the life/death monitoring message will not arrive at the wireless LANAP 30a or the arriving radio wave intensity will be weakened.

If the radio wave intensity of a beacon arriving at from the portable terminal 5a is below a threshold value or the time period when a beacon does not arrive at lasts for a certain time period or longer, the radio wave state monitor unit 83 instructs the telephone conversation state monitor unit 84 to confirm the telephone conversation state of the portable terminal 5a (Op203). The telephone conversation state monitor unit 84 refers to the telephone conversation state recording unit 85 and confirms whether the portable terminal 5a is busy or not. If the portable terminal 5a is busy, it is judged that the communication state of the portable terminal 5a has deteriorated during the telephone conversation, thus becoming impossible to communicate. The telephone conversation state monitor unit 84 informs the request unit 81a that the portable terminal 5a has become impossible to communicate during a telephone conversation (Op204).

The request unit 81a requests the reservation unit 61 to resume a telephone conversation (Op1). The processing of Op1 is similar to the above-stated processing of Op1 shown in FIG. 3 concerning Embodiment 1. The process flow for the telephone conversation continuation also is similar to the processing of FIG. 3.

In the present embodiment, at the time when the radio wave intensity of a beacon is below a threshold value, the possibility of the deterioration of the communication state of the portable terminal 5a can be detected. Therefore, as compared with the case where the judgment is made by the SIP server 2, the deterioration of the communication state can be detected at an earlier stage.

Note here that in the present embodiment although the telephone conversation state monitor unit 84 refers to the telephone conversation state recording unit 85 provided in the wireless LANAP 30a so as to acquire the telephone conversation state of the portable terminal 5a, the telephone conversation state recording unit 85 is not necessarily provided in the wireless LANAP 30a. Instead, the telephone conversation state monitor unit 84 may refer to a telephone conversation state recording unit provided in equipment outside of the wireless LANAP 30a, such as the SIP server 2 and a wireless LAN switch.

Figure 11:
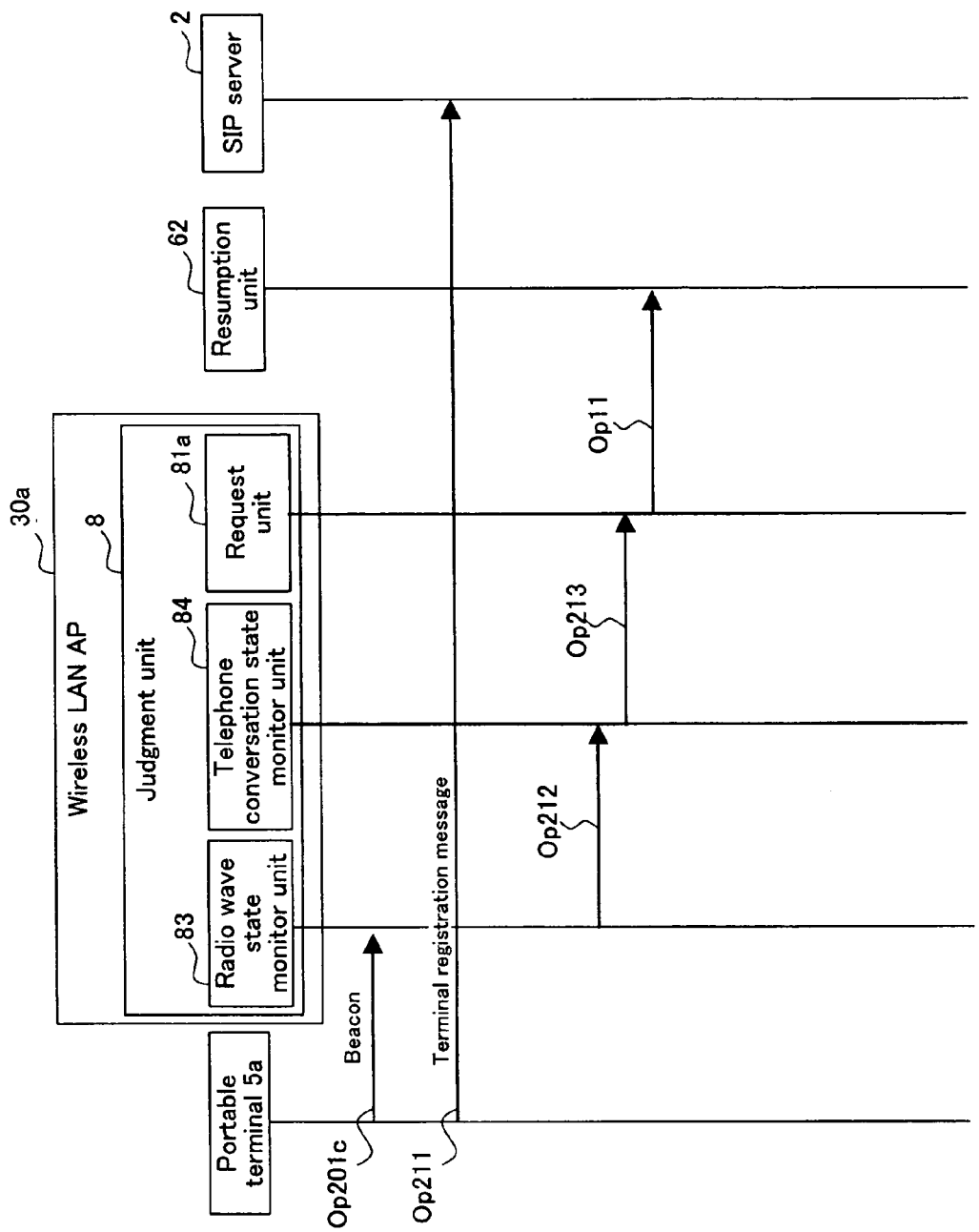
FIG. 11 is a sequence diagram showing the flow of a processing to detect the recovery of a communication state of a portable terminal and then transmit a request for telephone conversation resumption.

FIG. 11 is a sequence diagram showing the flow of a processing by the judgment unit 8a to detect the recovery of the communication state of the portable terminal 5a and then transmit a request for the resumption of a telephone conversation. FIG. 11 shows, as one example, the processing conducted when, following the processing of FIG. 10 for detecting the communication impossibility of the portable terminal 5a and the processing of FIG. 3 for reserving telephone conversation resumption, the recovery of the communication state between the portable terminal 5a and the wireless LANAP 30a is detected, and the resumption of a telephone conversation is requested.

When the communication state between the portable terminal 5a and the wireless LANAP 30a recovers, a beacon is transmitted from the portable terminal 5a to the wireless LANAP 30a (Op201c). Further, a terminal registration message is transmitted from the portable terminal 5a to the SIP server 2 (Op211). When the radio wave intensity of the beacon exceeds the threshold value, the radio wave state monitor unit 83 informs the telephone conversation state monitor unit 84 that the portable terminal 5a becomes possible to communicate with the wireless LANAP 30a (Op212). The telephone conversation state monitor unit 84 refers to the reserved telephone conversation recording unit 63 and confirms whether the telephone conversation involving the portable terminal 5a is reserved or not. If the telephone conversation involving the portable terminal 5a is reserved, the telephone conversation state monitor unit 84 instructs the request unit 81a to request the telephone conversation resumption of the portable terminal 5a (Op213). The request unit 81a requests the resumption unit 62 to resume a telephone conversation (Op11). The processing of Op11 is similar to the above-stated processing of Op11 of FIG. 7 concerning Embodiment 1. In this way, in the wireless LANAP 30a, the recovery of the communication state of the portable terminal 5a is detected, and a request for resuming a telephone conversation is transmitted to the resumption unit 62.

Embodiment 3

Figure 12:
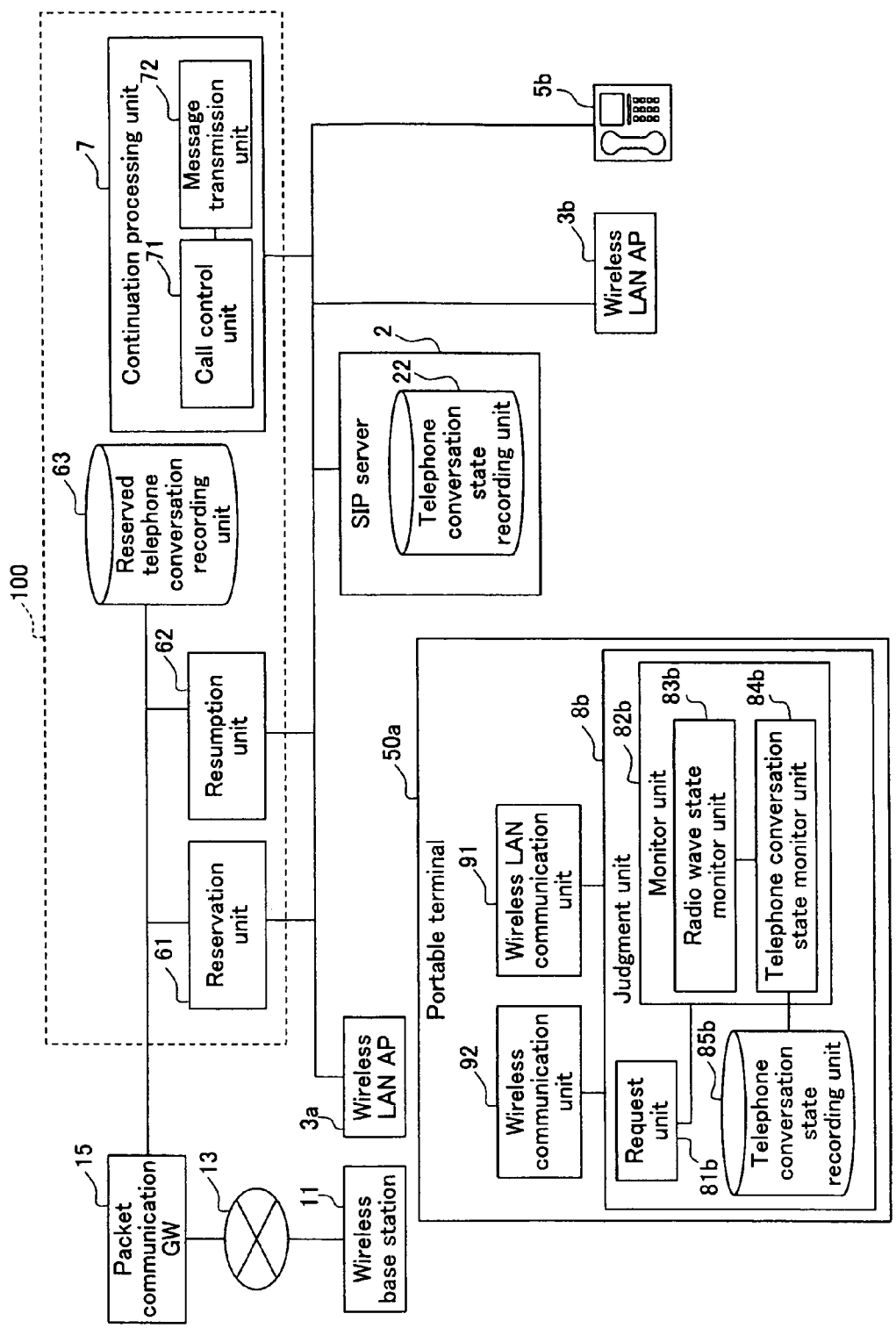
FIG. 12 is a functional block diagram showing the overall configuration of a communication system including a telephone conversation resumption system according to Embodiment 3.

FIG. 12 is a functional block diagram showing the overall configuration of a communication system including a telephone conversation resumption system 100 according to Embodiment 3. In FIG. 12, the same reference numerals are assigned to the same functional blocks as those of FIG. 1, and their explanations are not repeated. In the present embodiment, a judgment unit 8b is provided in a portable terminal 50a.

In the present embodiment, a reservation unit 61 and a resumption unit 62 of the telephone conversation resumption system 100 is connected with a packet network 13 via a packet communication gateway 15 (hereinafter called a packet communication GW 15). The packet communication GW 15 enables data communication by using reverse proxy, SSL-VPN or the like, even when a security apparatus such as firewall exists between the packet network 13 and the reservation unit 61 and the resumption unit 62.

The packet network 13 is provided with a wireless base station 11. The portable terminal 50a is provided with a wireless communication unit 92 as an interface for the communication with the wireless base station. Thereby, the portable terminal 50a can access the reservation unit 61 and the resumption unit 62 via the packet network 13.

The portable terminal 50a is provided with a wireless LAN communication unit 91 and the judgment unit 8b in addition to the wireless communication unit 92. The wireless LAN communication unit 91 is an interface for enabling the communication with the wireless LANAPs 3a and 3b.

The judgment unit 8b is provided with a request unit 81b, a monitor unit 82b and a telephone conversation state recording unit 85b. The monitor unit 82b includes a radio wave state monitor unit 83b and a telephone conversation state monitor unit 84b. The radio wave state monitor unit 83b monitors a state of radio wave for the wireless communication of the portable terminal 50a with the wireless LANAP 3a or 3b. The radio wave state monitor unit 83b detects that the communication with the wireless LANAP 3a or 3b becomes impossible due to the deterioration of the communication state with the wireless LANAP 3a or 3b. Further, the radio wave state monitor unit 83b detects that the communication state with the wireless LANAP 3a or 3b recovers.

The telephone conversation state monitor unit 84b monitors a state of a telephone conversation performed by the portable terminal 50a, and records the state in the telephone conversation state recording unit 85b. On the telephone conversation state recording unit 85b, data indicating that the portable terminal is busy, data indicating the other-end terminal of the telephone conversation, a telephone conversation identifier of the telephone conversation in progress, a reservation ID and the like are recorded, for example. Thereby, the telephone conversation state monitor unit 84b refers to the data in the telephone conversation state recording unit 85*b*, and can judge whether the portable terminal 50*a* is busy or not and whether the resumption of a telephone conversation of the portable terminal 50*a* is reserved or not.

In accordance with the results monitored by the radio wave state monitor unit 83*b* and the telephone conversation state monitor unit 84*b*, the request unit 81*b* transmits a request message that requests the reservation unit 61 to reserve telephone conversation resumption. Further, in accordance with these results, the request unit 81*b* transmits a request message that requests the resumption unit 62 to resume a telephone conversation.

The request message transmitted by the request unit 81*b* arrives at the reservation unit 61 or the resumption unit 62 via the wireless communication unit 92, the wireless base station 11, the packet network 13 and the packet communication GW 15. A response message from the reservation unit 61 or the resumption unit 62 also arrives at the judgment unit 8*b* via these units.

Figure 13:
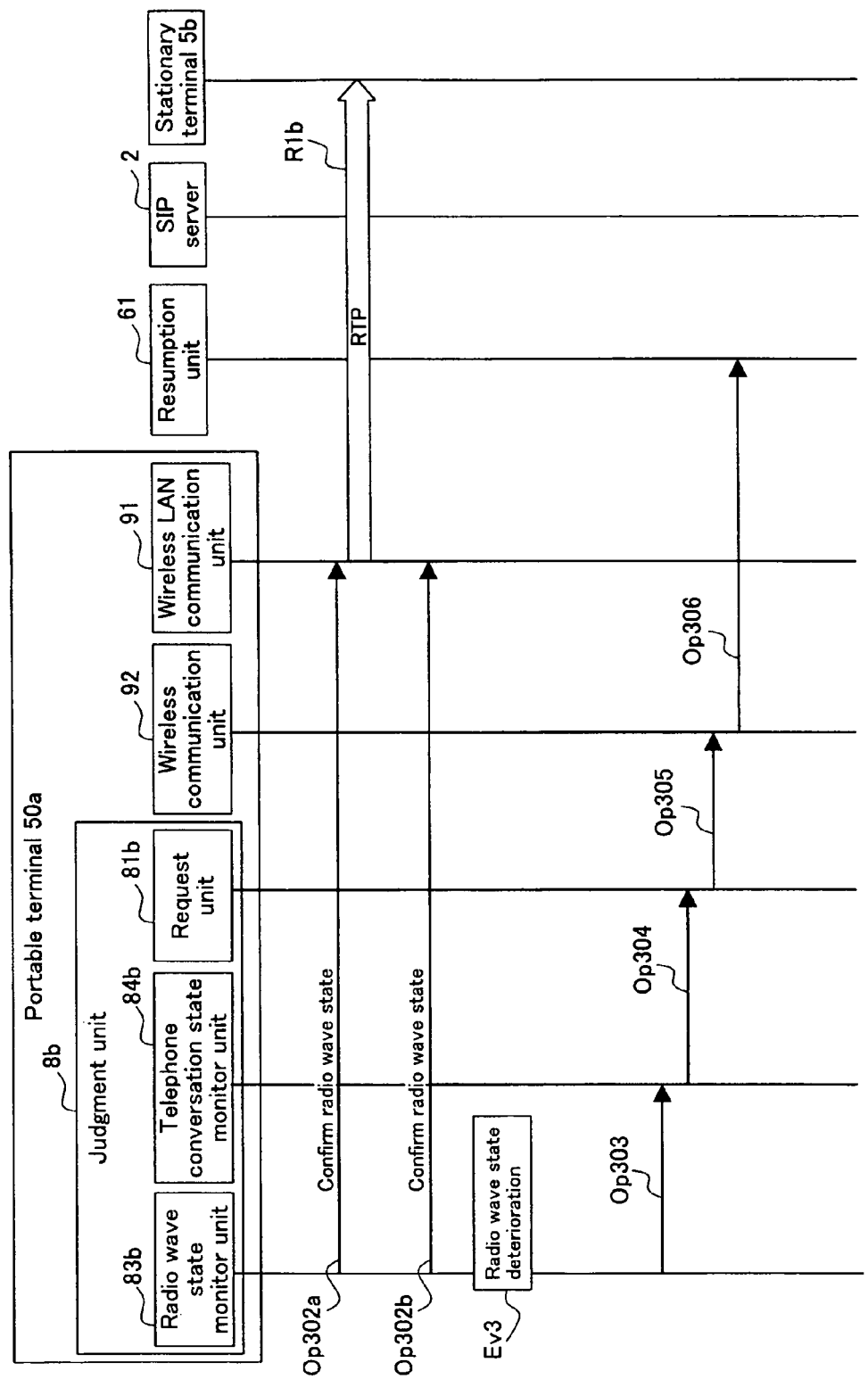
FIG. 13 is a sequence diagram showing an exemplary processing by a judgment unit to detect communication impossibility of a portable terminal and transmit a request for reserving telephone conversation resumption.

FIG. 13 is a sequence diagram showing an exemplary processing by the judgment unit 8*b* to detect that the portable terminal 50*a* becomes impossible to communicate during a telephone conversation and transmit a request message for reserving telephone conversation resumption to the reservation unit 61. FIG. 13 shows, as one example, the processing conducted when the communication between the portable terminal 50*a* and the wireless LANAP 3*a* becomes impossible during a telephone conversation between the portable terminal 50*a* and a stationary terminal 5*b*.

The telephone conversation between the portable terminal 50*a* and the stationary terminal 5*b* is implemented by transmitting/receiving audio data in accordance with RTP (R1*b*).

The radio wave state monitor unit 83*b* confirms the radio wave state between the portable terminal 50*a* and the wireless LANAP 3*a* regularly (Op302*a*, Op302*b*). For instance, in the case where the portable terminal 50*a* in a telephone conversation within a communication area of the wireless LANAP 3*a* moves outside the communication area, the communication state between the wireless LANAP 3*a* and the portable terminal 50*a* will deteriorate (Ev3). In such a case, the radio wave state monitor unit 83*b* detects the deterioration of the communication state.

When detecting the deterioration of the communication state, the radio wave state monitor unit 83*b* instructs the telephone conversation state monitor unit 84*b* to confirm the telephone conversation state of the portable terminal 50*a* (Op303). The telephone conversation state monitor unit 84*b* confirms whether the portable terminal 50*a* is busy or not by referring to the telephone conversation state recording unit 85*b*. If the portable terminal 50*a* is busy, the telephone conversation state monitor unit 84*b* judges that the communication state deteriorates during the telephone conversation of the portable terminal 50*a*, thus making it impossible to communicate. The telephone conversation state monitor unit 84*b* informs the request unit 81*b* that the portable terminal 50*a* becomes impossible to communicate during a telephone conversation (Op304). The request unit 81*b* passes a request message that requests the reservation unit 61 to reserve telephone conversation resumption to the wireless communication unit 92 (Op305). The wireless communication unit 92 transmits a request message that requests to reserve telephone conversation resumption to the reservation unit 61 via the packet network 13 (Op306).

In the processing of FIG. 13, the judgment unit 8*b* provided in the portable terminal 50*a* directly monitors its own communication state. Thus, as compared with the case where the communication state is monitored by the SIP server 2 so as to make a judgment, the deterioration of the communication state can be detected at an earlier stage.

Figure 14:
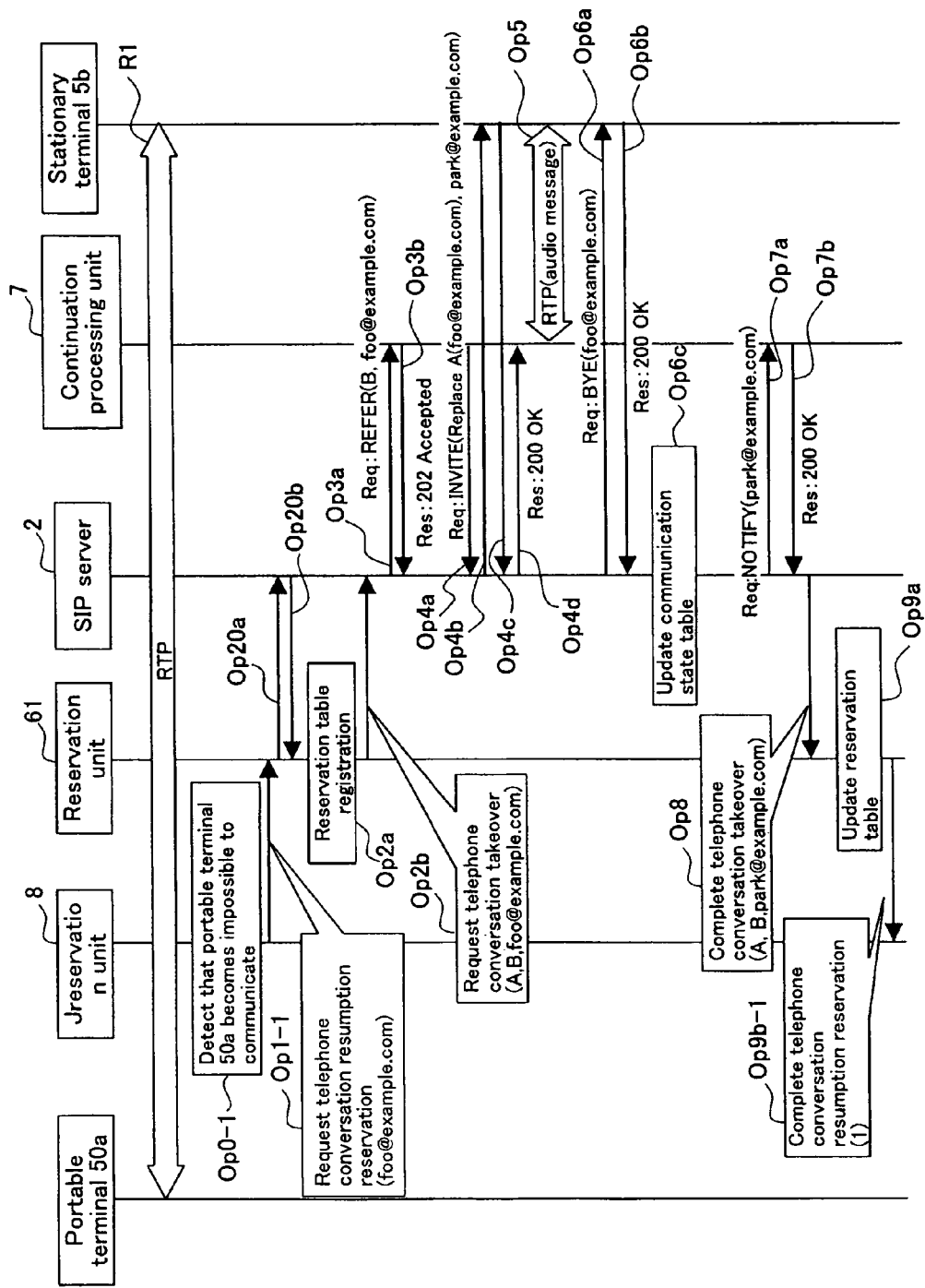
FIG. 14 is a sequence diagram showing the flow of a processing to reserve telephone conversation resumption.

FIG. 14 is a sequence diagram showing the flow of a processing by the telephone conversation resumption system 100 to reserve telephone conversation resumption after the judgment unit 8*b* of the portable terminal 50*a* detects the communication impossibility. FIG. 14 shows, as one example, the processing conducted in the case where after the judgment unit 8*b* detects that the portable terminal 50*a* becomes impossible to communicate during a telephone conversation by the processing of FIG. 13, a request message for reserving telephone conversation resumption is transmitted to the reservation unit 61. In the processing of FIG. 14, the same reference numerals are assigned to the processings similar to those of FIG. 3, and their explanations are not repeated.

When the judgment unit 8*b* detects the communication impossibility of the portable terminal 50*a* due to the deterioration of the communication state (Op0-1), the judgment unit 8*b* requests the reservation unit 61 to reserve telephone conversation resumption between the portable terminal 50*a* and the stationary terminal 5*b* (Op1-1). At this time, the judgment unit 8*b* acquires a telephone conversation identifier indicating the telephone conversation between the portable terminal 50*a* and the stationary terminal 5*b* from the telephone conversation state recording unit 85*b* of the portable terminal 50*a*, and transmits it to the reservation unit 61. The request for the reservation unit 61 at Op1-1 is performed via the packet communication network 13. The following describes one specific example where the telephone conversation identifier is "foo@example.com", the terminal identifier of the portable terminal 50*a* is "A" and the terminal identifier of the stationary terminal 5*b* is "B".

When receiving the request for reserving telephone conversation resumption from the judgment unit 8*b*, the reservation unit 61 refers to the telephone conversation state recording unit 22 of the SIP server 2, and acquires the terminal identifiers of the terminals used for the telephone conversation indicated by the telephone conversation identifier "foo@example.com", i.e., the terminal identifier "A" of the portable terminal 50*a* and the terminal identifier "B" of the stationary terminal 5*b* (Op20*a*, Op20*b*).

The reservation unit 61 records the terminal identifier "A" of the portable terminal 50*a*, the terminal identifier "B" of the stationary terminal 5*b* and the telephone conversation identifier "foo@example.com" of the telephone conversation between the portable terminal 50*a* and the stationary terminal 5*b* in the reserved telephone conversation recording unit 63 (Op2*a*). The following processing at Op2*b* to Op9*a* is similar to that of FIG. 3.

At Op9*b*-1, the reservation unit 61 transmits to the judgment unit 8*b* a response message indicating that the reservation of telephone conversation resumption has been completed. This response message is transmitted to the judgment unit 8*b* via the packet communication network 13. This response message contains the reservation ID "1". The judgment unit 8*b* records the received reservation ID "1" in the telephone conversation state recording unit 85*b*.

In the processing of FIG. 14, the data transmitted from the judgment unit 8*b* to the reservation unit 61 may be just a telephone conversation identifier. Based on the telephone conversation identifier transmitted from the judgment unit 8*b*, the reservation unit 61 can acquire the terminal identifiers of the telephone conversation terminals on both ends from the telephone conversation state recording unit 22 of SIP server. Therefore, even when the portable terminal 50*a* does not record the terminal identifier of the terminal on the other end (the stationary terminal 5b), the telephone conversation resumption can be reserved.

Figure 15:
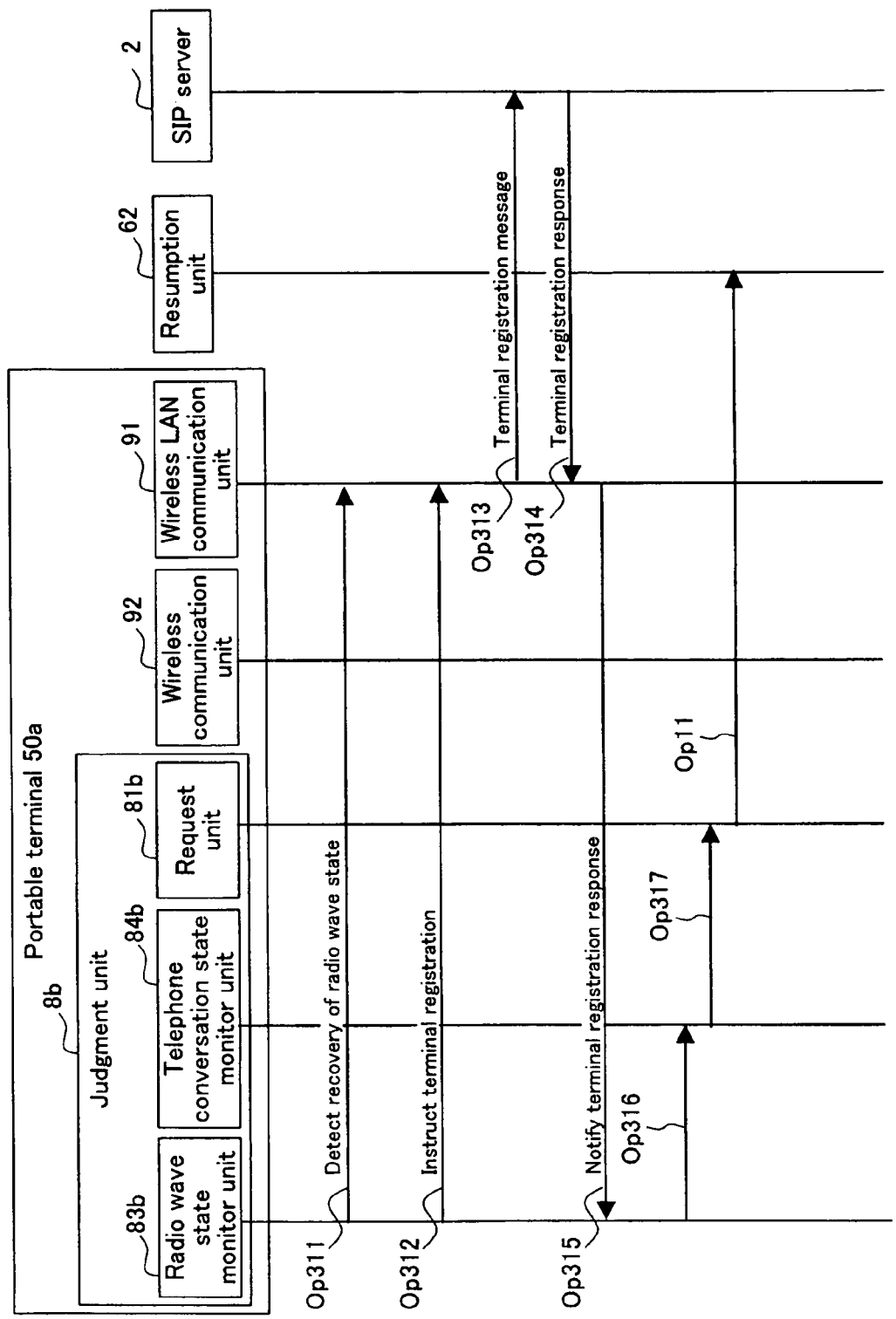
FIG. 15 is a sequence diagram showing an exemplary processing by a judgment unit to detect the recovery of a communication state of a portable terminal and then transmit a request for telephone conversation resumption.

FIG. 15 is a sequence diagram showing an exemplary processing by the judgment unit 8b to request the telephone conversation resumption after the recovery of the communication state of the portable terminal 50a is detected. FIG. 15 shows, as one example, the processing conducted when, following the processing of FIG. 13 for detecting the communication impossibility of the portable terminal 50a and the processing of FIG. 14 for reserving telephone conversation resumption, the recovery of the communication state between the portable terminal 50a and the wireless LANAP 3a is detected, and the resumption of a telephone conversation is requested.

When the communication state between the wireless LAN communication unit 91 of the portable terminal 50a and the wireless LANAP 3a recovers, the radio wave state monitor unit 83b detects the recovery of a radio wave state (Op311). The radio wave state monitor unit 83b instructs the wireless LAN communication unit 91 to transmit a terminal registration message (Op312).

When the wireless LAN communication unit 91 transmits the terminal registration message to the SIP server 2 (Op313), a terminal registration response indicating that the terminal registration has been completed is returned from the SIP server 2 (Op314). The wireless LAN communication unit 91 notifies the radio wave state monitor unit 83b of the received terminal registration response (Op315).

The radio wave state monitor unit 83b informs the telephone conversation state monitor unit 84b that the terminal registration has been completed (Op316). The telephone conversation state monitor unit 84b confirms whether there is a reserved telephone conversation or not. If there is a reservation of a telephone conversation, the judgment unit 8b receives a reservation ID from the reservation unit 61 in accordance with the processing at Op9b-1 of FIG. 14. Since the received reservation ID is recorded in the telephone conversation state recording unit 85b, the telephone conversation state monitor unit 84b confirms whether there is a reserved telephone conversation or not by referring to the telephone conversation state recording unit 85b.

If there is a reserved telephone conversation, the telephone conversation state monitor unit 84b passes the reservation ID to the request unit 81b and instructs to resume the telephone conversation of the portable terminal 50a (Op317). The request unit 81a transmits to the resumption unit 62 a message for requesting the telephone conversation resumption together with the reservation ID (Op11). The message for requesting the telephone conversation resumption and the reservation ID are transmitted via the wireless LAN communication unit 91. The processing at Op11 is similar to the above-stated processing at Op1 of FIG. 7 concerning Embodiment 1. In this way, the portable terminal 50a detects the recovery of the communication state, and a request for resuming the telephone conversation is transmitted to the resumption unit 62.

Note here that in the present embodiment although the communication between the judgment unit 8b and the reservation unit 61 and the communication between the judgment unit 8b and the resumption unit 62 are performed via the packet network 13, they are not limited to the communication via the packet network 13. As long as it is a communication method other than the communication via wireless LANAPs, other communication methods may be used for realizing the communication between the judgment unit 8b and the reservation unit 61 and the communication between the judgment unit 8b and the resumption unit 62. For instance, a circuit switched network for mobile communication may be used for the communication between the judgment unit 8b and the reservation unit 61 and the communication between the judgment unit 8b and the resumption unit 62.

Embodiment 4

Figure 16:
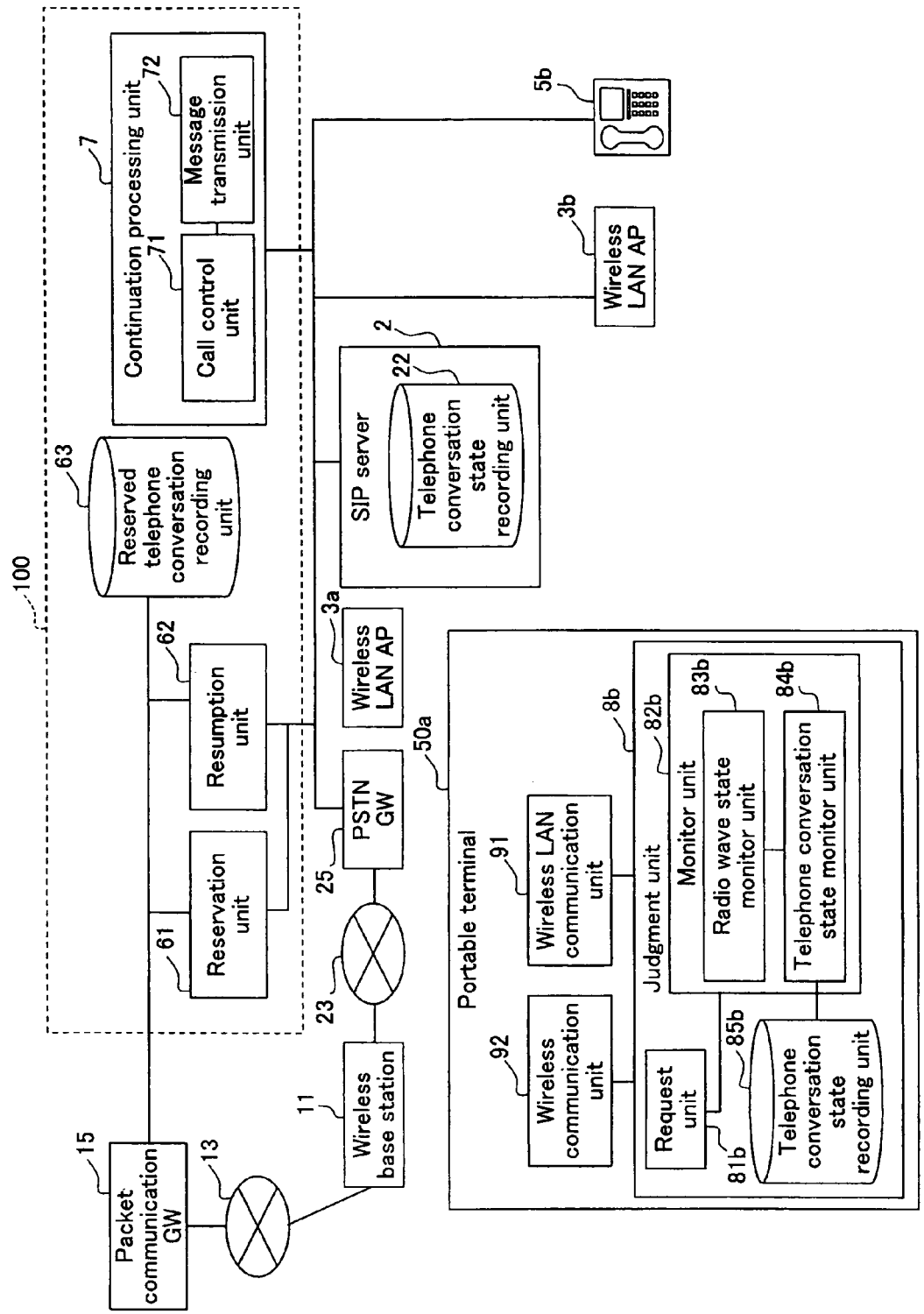
FIG. 16 is a functional block diagram showing the overall configuration of a communication system including a telephone conversation resumption system according to Embodiment 4.

FIG. 16 is a functional block diagram showing the overall configuration of a communication system including a telephone conversation resumption system according to the present embodiment. In FIG. 16, the same reference numerals are assigned to the same functional blocks as those of FIG. 12, and their explanations are not repeated. In the present embodiment, a telephone conversation resumption system 101, a SIP server 2, a wireless LANAP 3a, 3b and a stationary terminal 5b are connected to a public switched telephone network (PSTN) 23 via a public switched telephone network gateway (hereinafter called PSTNGW 25). The PSTN 23 is connected to a wireless base station 11.

A portable terminal 50a is provided with a wireless LAN communication unit 91 and a wireless communication unit 92 as an interface for the communication with the wireless base station 11. Therefore, the portable terminal 50a can communicate with another telephone conversation terminal (e.g., the stationary terminal 5b) by means of the wireless communication unit 92 via the PSTN 23, and can communicate with still another terminal by means of the wireless LAN communication unit 91.

A communication terminal like the portable terminal 50a equipped with a plurality of communication units such as a wireless LAN communication unit and a wireless communication unit is called a dual bearer terminal or a dual terminal. The portable terminal 50a records an identifier for wireless LAN communication (e.g., a terminal identifier of an IP phone) and an identifier in the PSTN (e.g., a circuit switching number) inside therein as data for identifying itself.

The processing by the judgment unit 8b to detect the communication impossibility of the portable terminal 50a during a telephone conversation and transmit a request message for reserving the telephone conversation resumption to the reservation unit 61 is performed in a similar manner to the processing of FIG. 13. The processing by the judgment unit 8b of the portable terminal 50a to detect the communication impossibility and the processing by the telephone conversation resumption system 101 to reserve the telephone conversation resumption also are performed in a similar manner to the processing of FIG. 14.

In the present embodiment, when the request unit 81b transmits a request for telephone conversation resumption to the reservation unit 61, a circuit switching number "090-XXXXXXXX" may be included as an identifier of the portable terminal 50a in addition to the terminal identifier "A" of an IP phone. Thereby, when the telephone conversation is resumed, the circuit switching number "090-XXXXXXXX" can be used to resume the telephone conversation via the PSTN 23. The following describes an exemplary processing by the portable terminal 50a to resume a telephone conversation via the PSTN 23.

Figure 17:
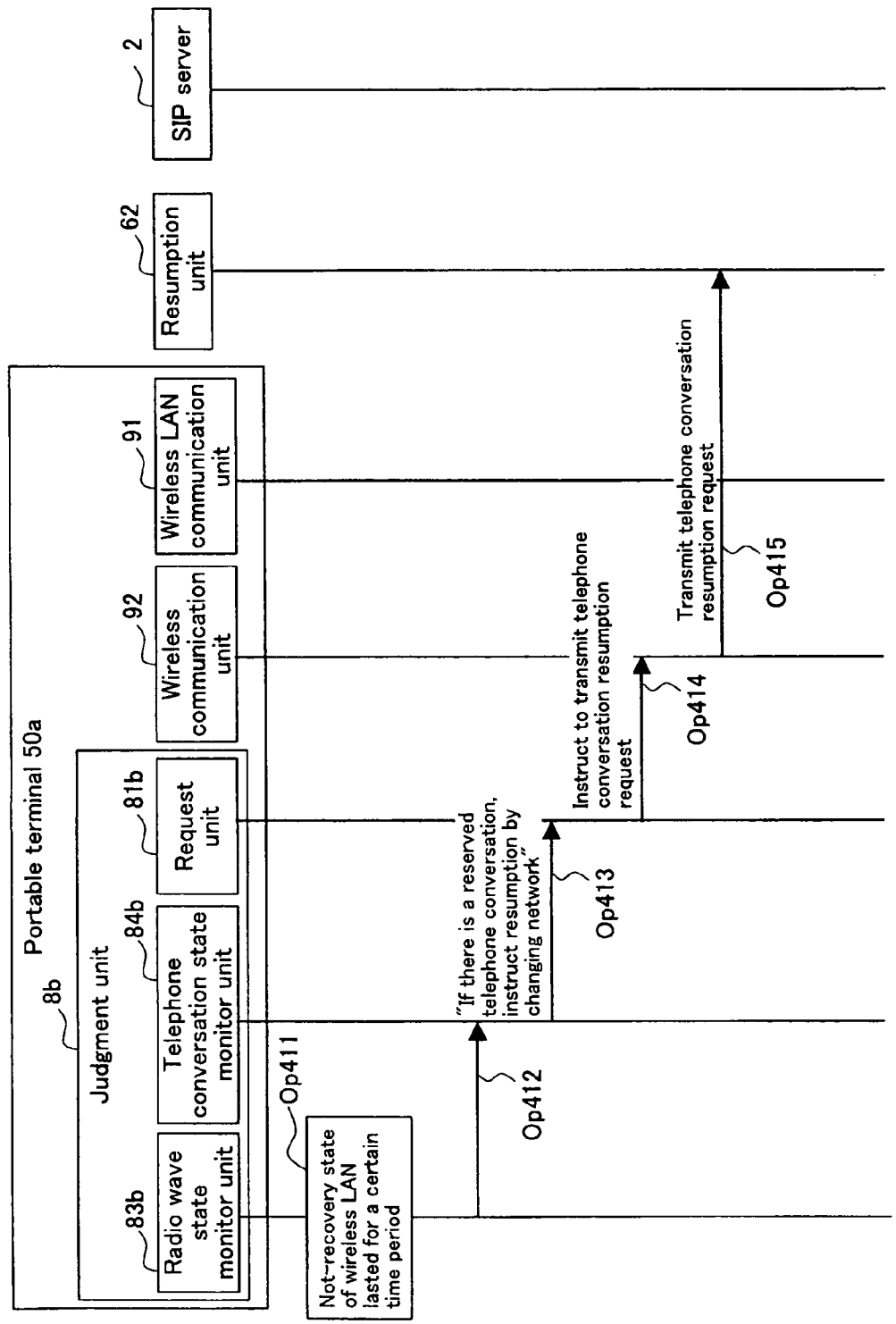
FIG. 17 is a sequence diagram showing an exemplary processing to request telephone conversation resumption via a public switched telephone network (PSTN).

FIG. 17 is a sequence diagram showing an exemplary processing by the portable terminal 50a to request the telephone conversation resumption via the PSTN 23. FIG. 17 shows, as one example, the processing conducted when, following the processing similar to the processing of FIG. 13 for detecting the communication impossibility of the portable terminal 50a and the processing similar to the processing of FIG. 14 for reserving telephone conversation resumption, the portable terminal 50a requests to resume a telephone conversation.

In the example of FIG. 17, a radio wave state monitor unit 83b detects that the state where the radio wave state between the wireless LANAP 3a and the portable terminal 50a does not recover lasted for a certain time period (Op411). The radio wave state monitor unit 83b informs a telephone conversation state monitor unit 84b that the state where the radio wave state does not recover lasted for a certain time period (Op412). The telephone conversation state monitor unit 84b confirms whether there is a reserved telephone conversation or not. If any telephone conversation is reserved, the reservation ID thereof is recorded in a telephone conversation state recording unit 85b. Therefore, the telephone conversation state monitor unit 84b can confirm whether there is a reserved telephone conversation or not by referring to the telephone conversation state recording unit 85b.

If there is a reserved telephone conversation, the telephone conversation state monitor unit 84b passes the reservation ID to the request unit 81b and instructs to resume the telephone conversation of the portable terminal 50a via the PSTN 23 (Op413). The request unit 81b instructs the wireless communication unit 92 to transmit a telephone conversation resumption request to the resumption unit 62 (Op414). The request unit 81b instructs the wireless communication unit 92 to transmit the telephone conversation resumption request to the resumption unit 62 so that the telephone conversation resumption request contains the reservation ID, the terminal identifier "A" of the portable terminal 50a and the circuit switching number "090-XXXXXXXX" of the portable terminal 50a. Then, the wireless communication unit 92 transmits as the telephone conversation resumption request the reservation ID, the terminal identifier "A" of the portable terminal 50a and the circuit switching number "090-XXXXXXXX" of the portable terminal 50a to the resumption unit 62 (Op415). The telephone conversation resumption request is transmitted to the resumption unit 62 via a packet network 13.

The present embodiment exemplifies the case where the judgment unit 8b requests to resume a telephone conversation via the PSTN 23 if the following two conditions are satisfied: that is, the state where the communication between the portable terminal 50a and the wireless LANAP 3a does not recover lasts for a certain time period; and the telephone conversation resumption of the portable terminal 50a has been reserved. However, the conditions for requesting the telephone conversation resumption via the PSTN 23 are not limited to them. For instance, the telephone conversation resumption via the PSTN 23 may be requested if the following two conditions are satisfied: a request for resuming a telephone conversation via the PSTN 23 is received through the operation by a user of the portable terminal; and the telephone conversation resumption has been reserved.

Figure 18:
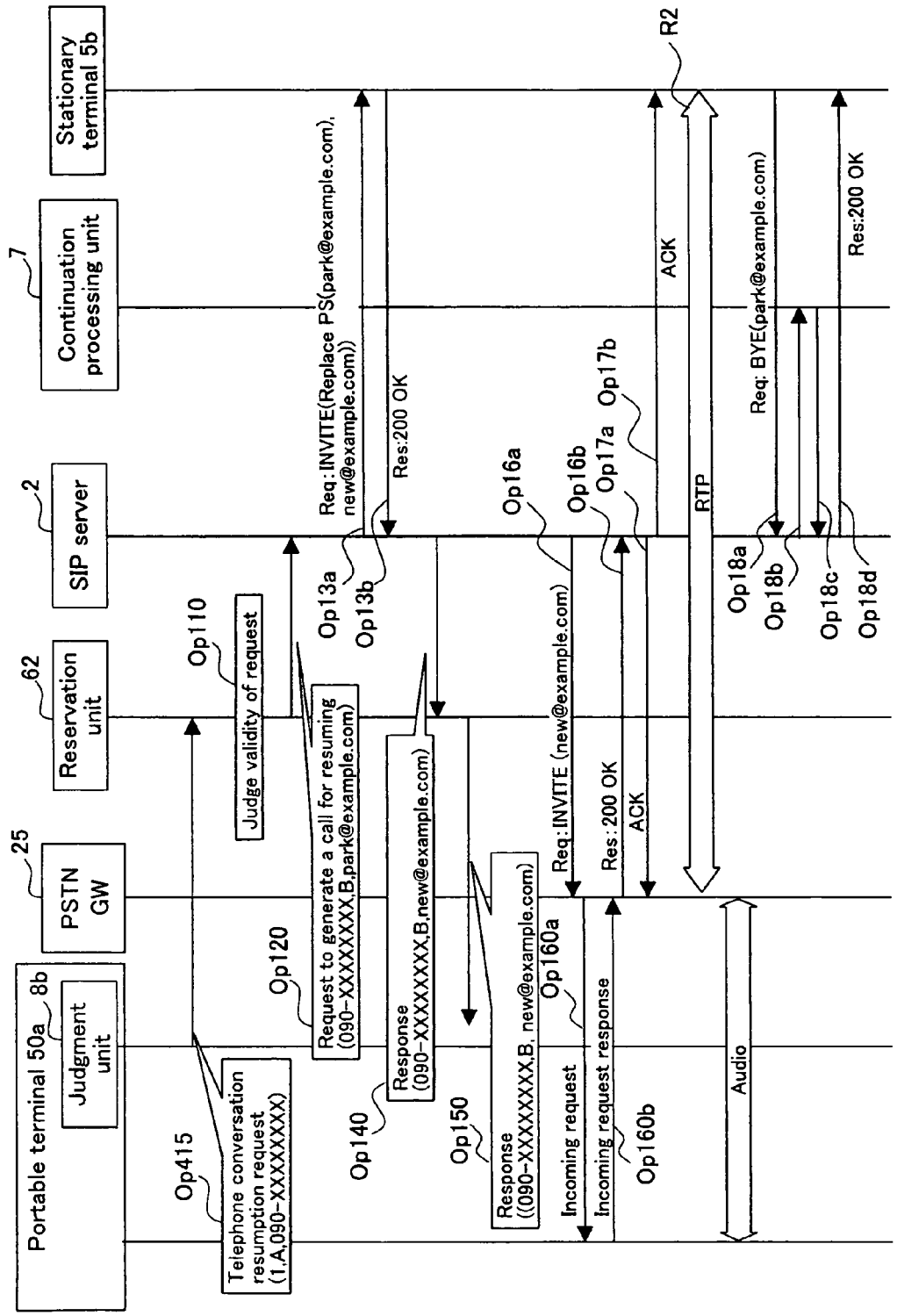
FIG. 18 is a sequence diagram showing an exemplary processing to resume a telephone conversation after a request for resuming a telephone conversation via the PSTN is transmitted to a resumption unit.

FIG. 18 is a sequence diagram showing an exemplary processing for resuming a telephone conversation after a request for resuming a telephone conversation via the PSTN 23 is transmitted from the portable terminal 50a to the resumption unit 62. FIG. 18 shows, as one example, the processing conducted after a telephone conversation resumption request is transmitted to the resumption unit 62 at Op415 of FIG. 17. Note here that the same reference numerals are assigned to the processing of FIG. 18 that are similar to that of FIG. 7, and their explanations are not repeated.

In FIG. 18, the judgment unit 8b of the portable terminal 50a transmits the terminal identifier "A" of the portable terminal 50a, the reservation ID "1" and the circuit switching number "090-XXXXXXXX" of the portable terminal 50a to the resumption unit 62 as the telephone conversation resumption request (Op415).

The resumption unit 62 refers to the reserved telephone conversation recording unit 63 to judge the validity of the received telephone conversation resumption request (Op110). For instance, the resumption unit 62 judges the validity by confirming whether the combination of the reservation ID "1" and the terminal identifier "A" included in the telephone conversation resumption request is recorded in a reservation table 64 as shown in FIG. 5B or not. If the combination of the reservation ID "1" and the terminal identifier "A" exists in the reservation table 64 as shown in FIG. 5B, it is judged that the telephone conversation resumption request is valid. The resumption unit 62 acquires from the reservation table 64 the continuation telephone conversation identifier "park@example.com" indicating the taken-over telephone conversation between the portable terminal 50a and the stationary terminal 5b.

When it is judged that the telephone conversation resumption request is valid, the resumption unit 62 requests the SIP server 2 to resume the telephone conversation between the portable terminal 50a and the stationary terminal 5b (Op120). At this time, the resumption unit 62 transmits the circuit switching number "090-XXXXXXXX" of the portable terminal 50a, the terminal identifier "B" of the stationary terminal 5b and the continuation telephone conversation identifier "park@example.com" indicating the telephone conversation between the stationary terminal 5b and the continuation processing unit 7 to the SIP server 2.

The SIP server 2 requests the stationary terminal 5b to switch from the telephone conversation with the continuation processing unit 7 to the telephone conversation with the portable terminal 50a (Op13a). The stationary terminal 5b transmits a response message indicating that the request can be accepted (Op13b). The SIP server 2 transmits a response message in response to the request from the resumption unit 62 (Op120) (Op140). The response message contains the circuit switching number "090-XXXXXXXX" of the portable terminal 50a, the terminal identifier "B" of the stationary terminal 5b and a resumption telephone conversation identifier "new@example.com" indicating the telephone conversation between the portable terminal 50a and the stationary terminal 5b, i.e., the telephone conversation to be resumed.

The resumption unit 62 transmits a response message to the judgment unit 8b (Op150). This response message contains "090-XXXXXXXX", "B" and "new@example.com" similar to the response message at Op14.

Further, the SIP server 2 transmits a call generation request message for resuming the telephone conversation between the portable terminal 50a and the stationary terminal 5b to the portable terminal 50a via the PSTNGW 25 (Op16a, Op160a). This request message contains INVITE method and the resumption telephone conversation identifier "new@example.com" indicating the telephone conversation to be resumed. The request message is converted at the PSTNGW 25 into a message in accordance with a protocol of the PSTN 23, and is delivered to the portable terminal 50a via the PSTN 23.

The portable terminal 50a transmits a response message indicating that the request is acceptable to the SIP server 2 via the PSTNGW 25 (Op160b, Op16b). This response message is converted at the PSTNGW 25 into a message in accordance with a SIP, and is delivered to the SIP server 2. Thereby, a call for resuming the telephone conversation between the portable terminal 50a and the stationary terminal 5b is generated.

The SIP server 2 transmits an ACK message to the PSTNGW 25 and the stationary terminal 5b (Op17a, 17b). At the PSTNGW 25, the ACK message is converted into a message in accordance with a protocol of the PSTN 23, and is delivered to the portable terminal 50a. Thereby, audio data is transmitted/received between the portable terminal 50a and the stationary terminal 5b. That is, the telephone conversation between the portable terminal 50a and the stationary terminal 5b is resumed.

In this way, as a result of the processing of FIG. 18, a telephone conversation can be resumed via the PSTN 23. According to the present embodiment, in the case where the communication state between the portable terminal 50a and the wireless LANAP 3a or 3b does not recover lasts for a certain time period or more, or in the case where a user of the portable terminal 50a performs an operation of instructing telephone conversation resumption via the PSTNGW 25, for example, the telephone conversation can be resumed via the PSTN 23. The present embodiment exemplifies the telephone conversation resumption using the PSTNGW 25. However, the present invention is not limited to the PSTNGW 25, and is applicable to the case of resuming a telephone conversation using other communication networks.

Embodiment 5

Figure 19:
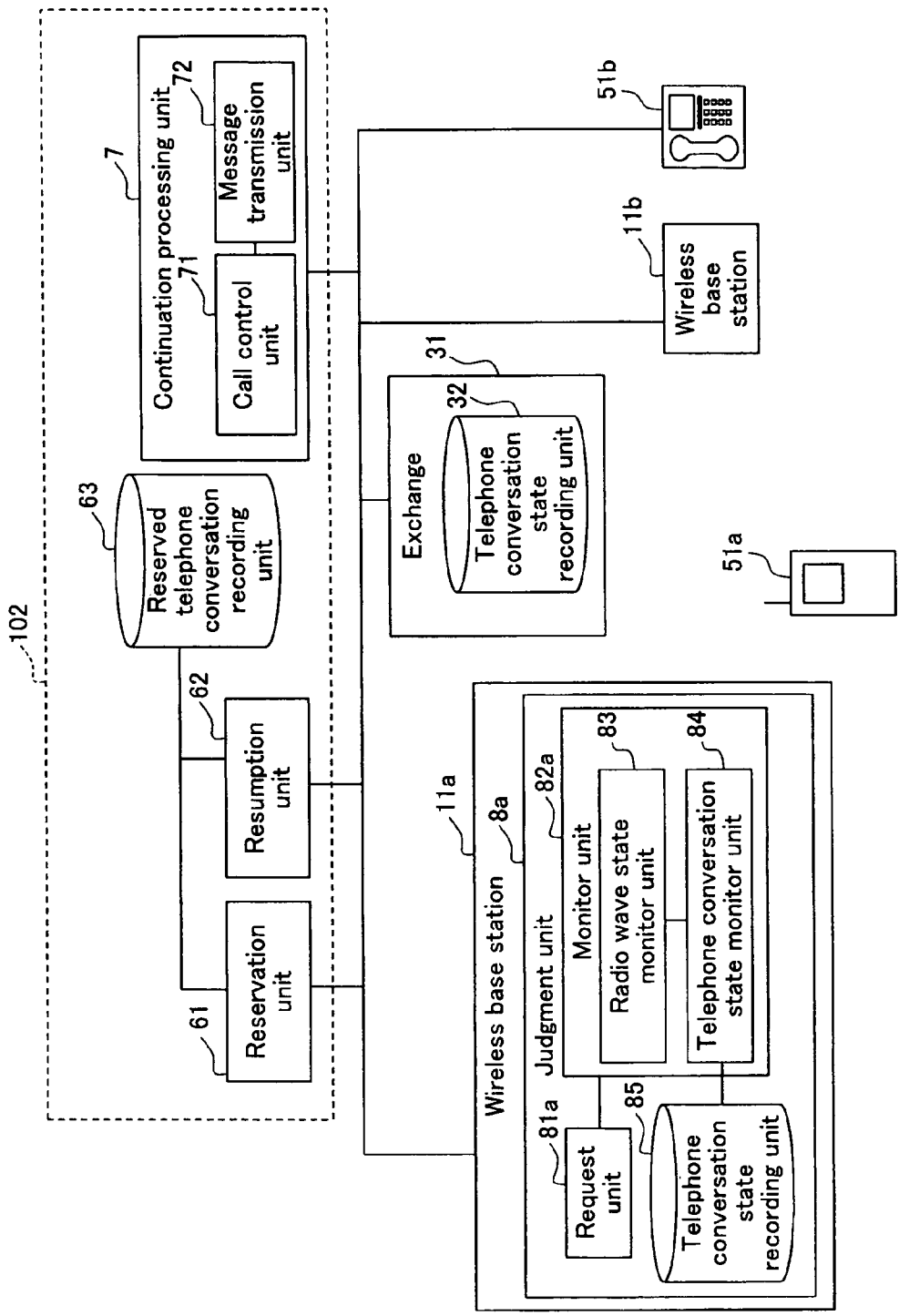
FIG. 19 is a functional block diagram showing the overall configuration of a communication system including a telephone conversation resumption system according to Embodiment 5.

FIG. 19 is a functional block diagram showing the overall configuration of a communication system including a telephone conversation resumption system according to the present embodiment. In FIG. 19, the same reference numerals are assigned to the same functional blocks as those of FIG. 9, and their explanations are not repeated. The communication system including a telephone conversation resumption system 102 of the present embodiment is not a communication system for an IP phone but a communication system using a PSTN of mobile phones. The telephone conversation resumption system 102 is connected with an exchange 31 as a call control apparatus and wireless base stations 11a and 11b as relay apparatuses.

The exchange 31 is an exchange in the PSTN, which controls the generation and completion of a call between telephone conversation terminals. The telephone conversation terminals to be controlled by the exchange 31 include a portable terminal 51a that communicates via the wireless base stations 11a and 11b and a stationary terminal 51b that communicates via a wire circuit. The exchange 31 is connected with a plurality of wireless base stations 11a and 11b and the stationary terminal 51b. The stationary terminal 51b may be a stationary type phone, for example. The wireless base stations 11a and 11b communicate with the portable terminal 51a located within their wireless communication area, thereby relaying the communication between the portable terminal 51a and the exchange 31 or other telephone conversation terminals. Thus, the portable terminal 51a can communicate with the exchange 31 and the stationary terminal 51b via the wireless base station 11a or 11b.

Note here that FIG. 19 illustrates one portable terminal 51a and one stationary terminal 51b as the examples of the telephone conversation terminals. However, in the actual communication system, a plurality of portable terminals and a plurality of stationary terminals will be subjected to the call control by the exchange 31.

A judgment unit 8a is provided in the wireless base stations 11a and 11b. In FIG. 19, the configuration of the judgment unit 8a is illustrated only in the wireless base station 11a, and the detailed configuration of the wireless base station 11b is omitted. The functions and operations of the judgment unit 8a, a reservation unit 61, a resumption unit 62 and a continuation processing unit 7 are similar to those of the above-stated Embodiment 2.

With the functions of the judgment unit 8a, the reservation unit 61, the resumption unit 62 and the continuation processing unit 7, even when the portable terminal 51a, which has communicated with the stationary terminal 51b, for example, becomes impossible to communicate with the wireless base station 11a because of deterioration of a communication state, an audio message informing of the communication state and operational instructions are transmitted to the stationary terminal 51b. Further, terminal identifiers of the portable terminal 51a and the stationary terminal 51b are recorded by the reservation unit 61 in a reserved telephone conversation recording unit 63, so that the telephone conversation can be resumed easily when the judgment unit 8a detects the recovery of the communication state.

In this way, the communication system to which the present invention is applicable is not limited to the communication system for an IP phone. As long as it is a communication system through which communication terminals perform wireless communication, the present invention is applicable to communication systems in various modes. The communication system via the PSTN like the present embodiment is one example of such communication systems.

Further, FIG. 19 exemplifies the case where the judgment unit 8a is provided in the wireless base station 11a. However, the judgment unit 8a may be provided in the exchange 31 or in the portable terminal 51a. Alternatively, the judgment unit 8a may be provided in a computer connected with the exchange 31 and the wireless base stations 11a and 11b.

The present invention can be used as a telephone conversation resumption system, a portable terminal, a relay apparatus and a call control apparatus that facilitate the resumption of a telephone conversation that has been disconnected against user's will because of deterioration of the communication state during the telephone conversation.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A telephone conversation resumption system that, in a communication network including a relay apparatus that is a wireless LAN access point and performs wireless communication with portable terminals and a call control apparatus that controls a call for starting or completing a telephone conversation between a plurality of terminals including at least one portable terminal and records information for specifying terminals in a telephone conversation, resumes a telephone conversation of a portable terminal that has become impossible for the relay apparatus to communicate with during the telephone conversation, the telephone conversation resumption system comprising:

a judgment unit that detects a communication impossibility between a portable terminal in a telephone conversation and the relay apparatus due to deterioration of a communication state between the portable terminal and the relay apparatus and recovery of the communication state between the portable terminal and the relay apparatus;

a reservation unit that, when the judgment unit detects the communication impossibility between the portable terminal and the relay apparatus, acquires terminal identification data that specifies the portable terminal and an other-end terminal that is a terminal of a party on the other end of the telephone conversation from the call control apparatus, the relay apparatus or the portable terminal and records the terminal identification data in a recording unit provided in the telephone conversation resumption system;

a continuation processing unit that requests the call control apparatus to generate a call with the other-end terminal indicated by the terminal identification data, and after the call is generated, transmits a message to the other-end terminal, the message containing information representing a communication state of the telephone conversation between the portable terminal and the other-end terminal or an operational instruction to a speaker of the other-end terminal; and a resumption unit that, when the judgment unit detects recovery of the communication state between the portable terminal and the relay apparatus, requests the call control apparatus to generate a call for resuming the telephone conversation between the portable terminal and the other-end terminal using the terminal identification data, wherein the judgment unit receives a signal transmitted from the portable terminal via the relay apparatus and detects, in accordance with the signal, the communication impossibility due to deterioration of a communication state between the portable terminal and the relay apparatus and recovery of the communication state between the portable terminal and the relay apparatus, and the judgment unit is provided in the relay apparatus and requests the reservation unit that is provided outside of the relay apparatus to reserve the telephone conversation resumption when detecting the communication impossibility due to the deterioration of the communication state and requests the resumption unit to resume the reserved telephone conversation when detecting the recovery of the communication state.

2. A telephone conversation resumption system that, in a communication network including a relay apparatus that is a wireless LAN access point and performs wireless communication with portable terminals and a call control apparatus that controls a call for starting or completing a telephone conversation between a plurality of terminals including at least one portable terminal and records information for specifying terminals in a telephone conversation, resumes a telephone conversation of a portable terminal that has become impossible for the relay apparatus to communicate with during the telephone conversation, the telephone conversation resumption system comprising:

a judgment unit that detects a communication impossibility between a portable terminal in a telephone conversation and the relay apparatus due to deterioration of a communication state between the portable terminal and the relay apparatus and recovery of the communication state between the portable terminal and the relay apparatus;

a reservation unit that, when the judgment unit detects the communication impossibility between the portable terminal and the relay apparatus, acquires terminal identification data that specifies the portable terminal and an other-end terminal that is a terminal of a party on the other end of the telephone conversation from the call control apparatus, the relay apparatus or the portable terminal and records the terminal identification data in a recording unit provided in the telephone conversation resumption system;

a continuation processing unit that requests the call control apparatus to generate a call with the other-end terminal indicated by the terminal identification data, and after the call is generated, transmits a message to the other-end terminal, the message containing information representing a communication state of the telephone conversation between the portable terminal and the other-end terminal or an operational instruction to a speaker of the other-end terminal; and a resumption unit that, when the judgment unit detects recovery of the communication state between the portable terminal and the relay apparatus, requests the call control apparatus to generate a call for resuming the telephone conversation between the portable terminal and the other-end terminal using the terminal identification data, wherein the judgment unit is provided in the relay apparatus and detects, in accordance with a signal transmitted from the portable terminal to the relay apparatus, the communication impossibility due to deterioration of a communication state between the portable terminal and the relay apparatus and recovery of the communication state between the portable terminal and the relay apparatus, and the judgment unit is provided in the relay apparatus and requests the reservation unit that is provided outside of the relay apparatus to reserve the telephone conversation resumption when detecting the communication impossibility due to the deterioration of the communication state and requests the resumption unit to resume the reserved telephone conversation when detecting the recovery of the communication state.

3. A telephone conversation resumption system that, in a communication network including a relay apparatus that is a wireless LAN access point and performs wireless communication with portable terminals and a call control apparatus that controls a call for starting or completing a telephone conversation between a plurality of terminals including at least one portable terminal and records information for specifying terminals in a telephone conversation, resumes a telephone conversation of a portable terminal that has become impossible for the relay apparatus to communicate with during the telephone conversation, the telephone conversation resumption system comprising:

a judgment unit that detects a communication impossibility between a portable terminal in a telephone conversation and the relay apparatus due to deterioration of a communication state between the portable terminal and the relay apparatus and recovery of the communication state between the portable terminal and the relay apparatus;

a reservation unit that, when the judgment unit detects the communication impossibility between the portable terminal and the relay apparatus, acquires terminal identification data that specifies the portable terminal and an other-end terminal that is a terminal of a party on the other end of the telephone conversation from the call control apparatus, the relay apparatus or the portable terminal and records the terminal identification data in a recording unit provided in the telephone conversation resumption system;

a continuation processing unit that requests the call control apparatus to generate a call with the other-end terminal indicated by the terminal identification data, and after the call is generated, transmits a message to the other-end terminal, the message containing information representing a communication state of the telephone conversation between the portable terminal and the other-end terminal or an operational instruction to a speaker of the other-end terminal; and a resumption unit that, when the judgment unit detects recovery of the communication state between the portable terminal and the relay apparatus, requests the call control apparatus to generate a call for resuming the telephone conversation between the portable terminal and the other-end terminal using the terminal identification data, wherein the judgment unit is provided in the portable terminal, and the portable terminal can access another communication network having a communication mode different from the communication network via wireless communication using the relay apparatus, the reservation unit and the resumption unit can access the another communication network, and the judgment unit passes data indicating the communication impossibility between the portable terminal and the relay apparatus to the reservation unit via the another communication network, and passes data indicating recovery of the communication state with the relay apparatus to the resumption unit via the another communication network.

4. A relay apparatus that is a wireless LAN access point and is connected with a communication network including: a call control apparatus that controls a call for starting or completing a telephone conversation between a plurality of terminals including at least one portable terminal and records information for specifying terminals in a telephone conversation; and a telephone conversation resumption system, the relay apparatus relaying communication between a portable terminal and the communication network by performing wireless communication with the portable terminal, the relay apparatus comprising:

a judgment unit that detects a communication impossibility between the portable terminal in a telephone conversation and the relay apparatus due to deterioration of a communication state between the portable terminal and the relay apparatus and recovery of the communication state between the portable terminal and the relay apparatus, wherein the telephone conversation resumption system included in the communication network to which the relay apparatus is connected comprises:

a reservation unit that, when the judgment unit detects the communication impossibility between the portable terminal and the relay apparatus, acquires terminal identification data that specifies the portable terminal and an other-end terminal that is a terminal of a party on the other end of the telephone conversation from the call control apparatus, the relay apparatus or the portable terminal and records the terminal identification data in a recording unit provided in the telephone conversation resumption system;

a continuation processing unit that requests the call control apparatus to generate a call with the other-end terminal indicated by the terminal identification data, and after the call is generated, transmits a message to the other-end terminal, the message containing information representing a communication state of the telephone conversation between the portable terminal and the other-end terminal or an operational instruction to a speaker of the other-end terminal; and a resumption unit that, when the judgment unit detects recovery of the communication state between the portable terminal and the relay apparatus, requests the call control apparatus to generate a call for resuming the telephone conversation between the portable terminal and the other-end terminal using the terminal identification data, wherein the judgment unit is provided in the relay apparatus and detects, in accordance with a signal transmitted from the portable terminal to the relay apparatus, the communication impossibility due to deterioration of a communication state between the portable terminal and the relay apparatus and recovery of the communication state between the portable terminal and the relay apparatus, and the judgment unit requests the reservation unit that is provided outside of the relay apparatus to reserve the telephone conversation resumption when detecting the communication impossibility due to the deterioration of the communication state and requests the resumption unit to resume the reserved telephone conversation when detecting the recovery of the communication state.

5. A portable terminal capable of accessing a first communication network and a second communication network, the first communication network including a relay apparatus that is a wireless LAN access point and performs wireless communication with portable terminals, a call control apparatus that controls a call for starting or completing a telephone conversation between a plurality of terminals including at least one portable terminal and records information for specifying terminals in a telephone conversation and a telephone conversation resumption system that resumes a telephone conversation of a terminal that has become impossible to communicate with during a telephone conversation, and the second communication network having a communication mode different from the first communication network and being connected with the telephone conversation resumption system, the portable terminal comprising:

a judgment unit that performs a processing of, during a telephone conversation via the first communication network, detecting a communication impossibility with the relay apparatus due to deterioration of a communication state with the relay apparatus and passing data indicating the communication impossibility to the telephone conversation resumption system via the second communication network, and a processing of detecting recovery of the communication state with the relay apparatus and transmitting data indicating the recovery of the communication state to the telephone conversation resumption system via the first communication network or the second communication network, wherein the telephone conversation resumption system comprises:

a reservation unit that, when data indicating the communication impossibility between the portable terminal and the relay apparatus is received from the portable terminal via the second communication network, acquires terminal identification data that specifies the portable terminal and an other-end terminal that is a terminal of a party on the other end of the telephone conversation from the call control apparatus or the relay apparatus in the first communication network or the portable terminal and records the terminal identification data in a recording unit provided in the telephone conversation resumption system;

a continuation processing unit that requests the call control apparatus to generate a call with the other-end terminal indicated by the terminal identification data, and after the call is generated, transmits a message to the other-end terminal, the message containing information representing a communication state of the telephone conversation between the portable terminal and the other-end terminal or an operational instruction to a speaker of the other-end terminal; and a resumption unit that, when data indicating recovery of the communication state between the portable terminal and the relay apparatus is received from the portable terminal via the second communication network, requests the call control apparatus to generate a call for resuming the telephone conversation between the portable terminal and the other-end terminal using the terminal identification data.

6. A computer readable non-transitory medium storing a telephone conversation resumption program that makes computers execute a processing of, in a communication network including a relay apparatus that is a wireless LAN access point and performs wireless communication with portable terminals and a call control apparatus that controls a call for starting or completing a telephone conversation between a plurality of terminals including at least one portable terminal and records information for specifying terminals in a telephone conversation, resuming a telephone conversation of a portable terminal that has become impossible for the relay apparatus to communicate with during the telephone conversation, the program making the computers execute the following processings of:

a judgment processing of detecting communication impossibility between the portable terminal in a telephone conversation and the relay apparatus due to deterioration of a communication state between the portable terminal and the relay apparatus and recovery of the communication state between the portable terminal and the relay apparatus;

a reservation processing of, when the communication impossibility between the portable terminal and the relay apparatus is detected in the judgment processing, acquiring terminal identification data that specifies the portable terminal and an other-end terminal that is a terminal of a party on the other end of the telephone conversation from the call control apparatus, the relay apparatus or the portable terminal and recording the terminal identification data in a recording unit provided in at least one of the computers;

a continuation processing of requesting the call control apparatus to generate a call with the other-end terminal indicated by the terminal identification data, and after the call is generated, transmitting a message to the other-end terminal, the message containing information representing a communication state of the telephone conversation between the portable terminal and the other-end terminal or an operational instruction to a speaker of the other-end terminal; and a resumption processing of, when recovery of the communication state between the portable terminal and the relay apparatus is detected in the judgment processing, requesting the call control apparatus to generate a call for resuming the telephone conversation between the portable terminal and the other-end terminal using the terminal identification data, wherein the judgment processing is executed by one of the computers provided in the relay apparatus and includes a process of detecting, in accordance with a signal transmitted from the portable terminal to the relay apparatus, the communication impossibility due to deterioration of a communication state between the portable terminal and the relay apparatus and recovery of the communication state between the portable terminal and the relay apparatus, and the judgment processing includes a process of requesting one of the computers that is provided outside of the relay apparatus to execute the reservation processing when detecting the communication impossibility due to the deterioration of the communication state and requesting the one of the computers that is provided outside of the relay apparatus to execute the resumption processing when detecting the recovery of the communication state.

7. A telephone conversation resumption method that, in a communication network including a relay apparatus that is a wireless LAN access point and performs wireless communication with portable terminals and a call control apparatus that controls a call for starting or completing a telephone conversation between a plurality of terminals including at least one portable terminal and records information for specifying terminals in a telephone conversation, makes computers resume a telephone conversation of a portable terminal that has become impossible for the relay apparatus to communicate with during the telephone conversation, the method comprising the steps of:

a judgment step in which a judgment unit provided in one of the computers detects a communication impossibility between a portable terminal in a telephone conversation and the relay apparatus due to deterioration of a communication state between the portable terminal and the relay apparatus and recovery of the communication state between the portable terminal and the relay apparatus;

a reservation step in which, when the communication impossibility between the portable terminal and the relay apparatus is detected in the judgment step, a reservation unit provided in one of the computers acquires terminal identification data that specifies the portable terminal and an other-end terminal that is a terminal of a party on the other end of the telephone conversation from the call control apparatus, the relay apparatus or the portable terminal and recording the terminal identification data in a recording unit provided in one of the computers;

a continuation step in which a continuation processing unit provided in one of the computers requests the call control apparatus to generate a call with the other-end terminal indicated by the terminal identification data, and after the call is generated, transmits a message to the other-end terminal, the message containing information representing a communication state of the telephone conversation between the portable terminal and the other-end terminal or an operational instruction to a speaker of the other-end terminal; and a resumption step in which, when recovery of the communication state between the portable terminal and the relay apparatus is detected in the judgment step, a resumption unit provided in the one of the computers requests the call control apparatus to generate a call for resuming the telephone conversation between the portable terminal and the other-end terminal using the terminal identification data, wherein the judgment unit is provided in the computer of the relay apparatus and detects, in accordance with a signal transmitted from the portable terminal to the relay apparatus, the communication impossibility due to deterioration of a communication state between the portable terminal and the relay apparatus and recovery of the communication state between the portable terminal and the relay apparatus, and the judgment unit requests the reservation unit provided in the computer outside of the relay apparatus to execute the reservation step when detecting the communication impossibility due to the deterioration of the communication state and requests the resumption unit provided in the computer outside of the relay apparatus to execute the resumption step when detecting the recovery of the communication state.

* * * * *